(12) United States Patent
Nadav

(10) Patent No.: US 11,627,284 B2
(45) Date of Patent: Apr. 11, 2023

(54) SYSTEM, METHOD, AND APPARATUS FOR SELECTIVE PARTICIPANT INTERACTION IN AN ONLINE MULTI-PARTICIPANT GATHERING SPACE

(71) Applicant: Raviv Nadav, New York, NY (US)

(72) Inventor: Raviv Nadav, New York, NY (US)

( * ) Notice: Subject to any disclaimer, the term of this patent is extended or adjusted under 35 U.S.C. 154(b) by 129 days.

(21) Appl. No.: 17/249,305

(22) Filed: Feb. 26, 2021

(65) Prior Publication Data

US 2021/0392291 A1 Dec. 16, 2021

Related U.S. Application Data

(60) Provisional application No. 62/705,167, filed on Jun. 14, 2020.

(51) Int. Cl.
| | | |
|---|---|---|
| *H04N 7/15* | (2006.01) | |
| *G06F 3/16* | (2006.01) | |
| *H04M 3/56* | (2006.01) | |

(52) U.S. Cl.
CPC ............ *H04N 7/152* (2013.01); *G06F 3/165* (2013.01); *H04M 3/568* (2013.01)

(58) Field of Classification Search
CPC combination set(s) only.
See application file for complete search history.

(56) References Cited

U.S. PATENT DOCUMENTS

| | | | |
|---|---|---|---|
| 2016/0088259 A1* | 3/2016 | Anderson | ............... H04N 7/157 348/14.03 |
| 2019/0344185 A1* | 11/2019 | Fargo | ....................... G06T 19/20 |
| 2021/0377062 A1* | 12/2021 | Stevens | ............... H04L 12/1822 |

* cited by examiner

*Primary Examiner* — Amal S Zenati

(57) ABSTRACT

A video communication system that allows users to focus on one another to create focused groups. The effect of these focused groups is the virtual equivalent of being in the same physical room as all users while having separate conversations in different areas of the room. Users are able to adjust the volume of other users independently and thus create this effect of being in different areas of the room, while still being in the same room.

15 Claims, 20 Drawing Sheets

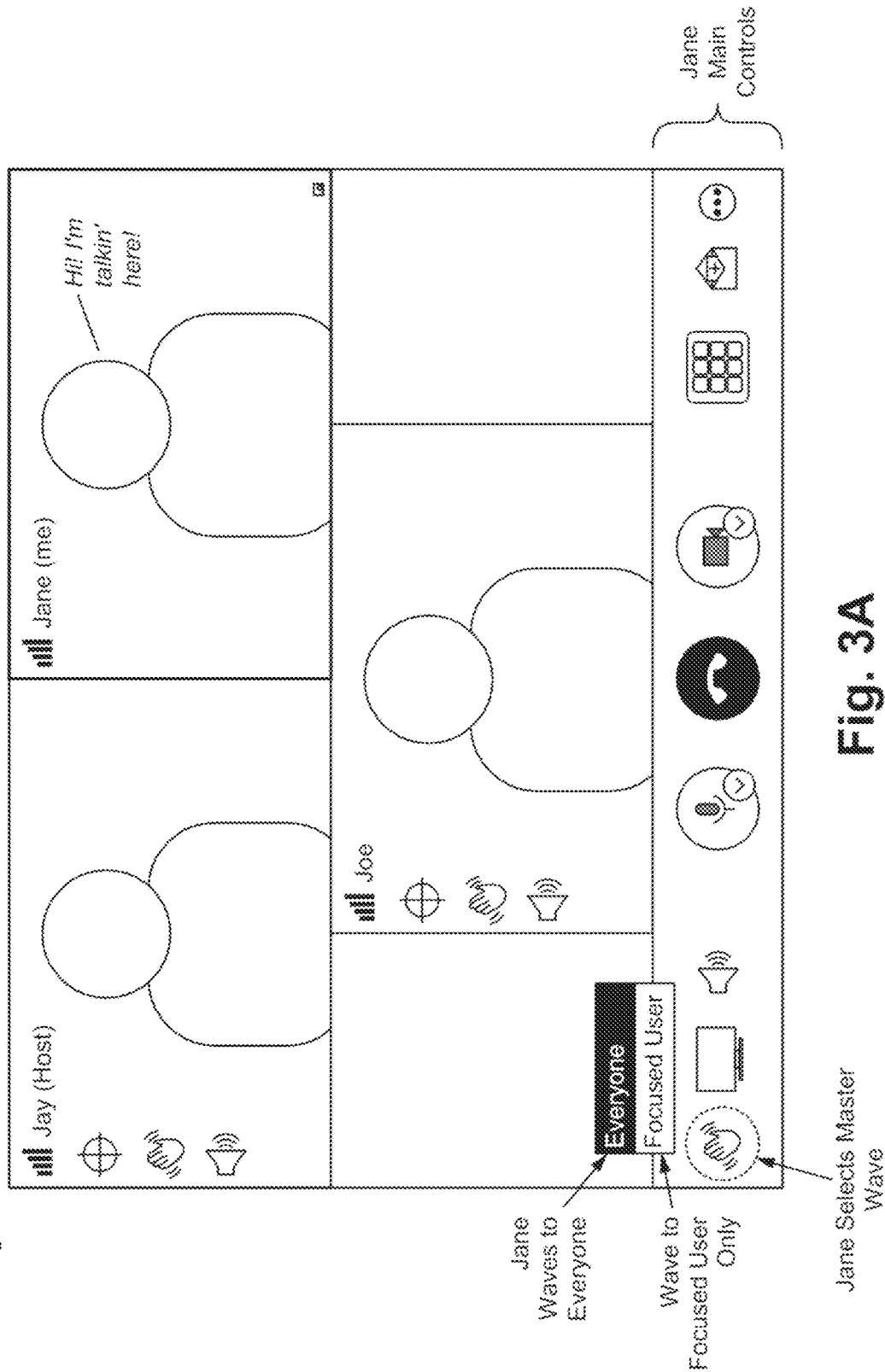

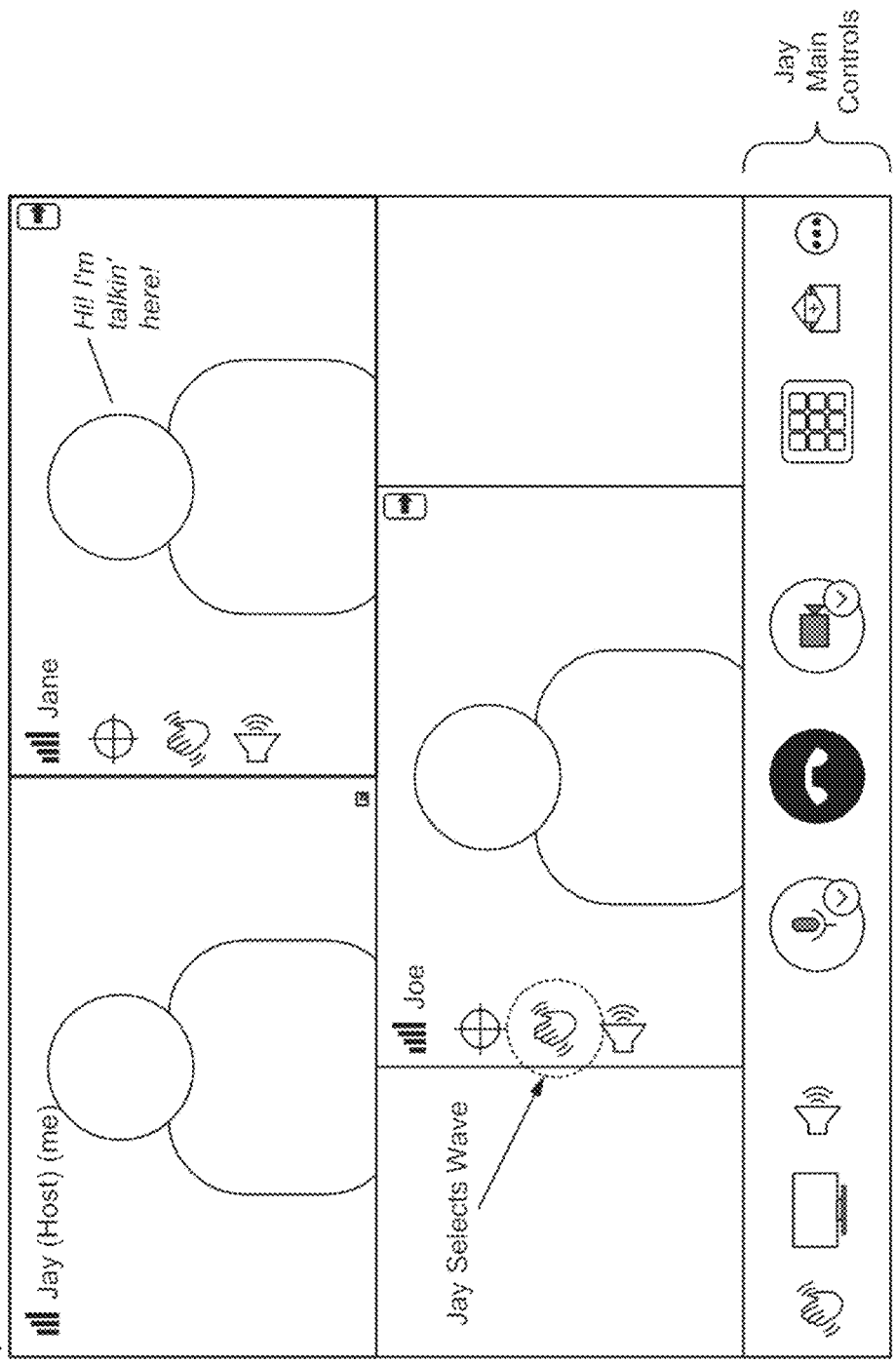

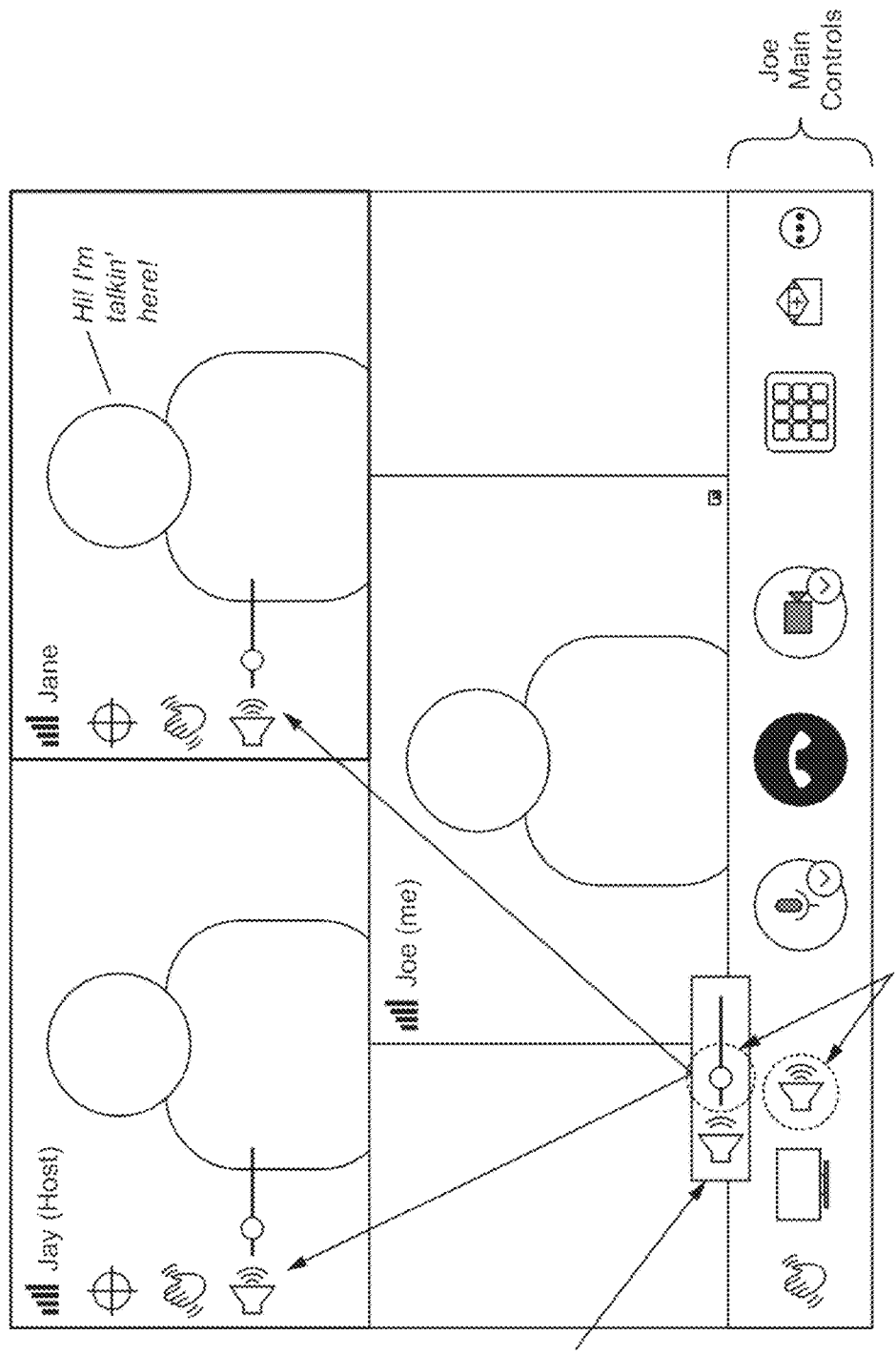

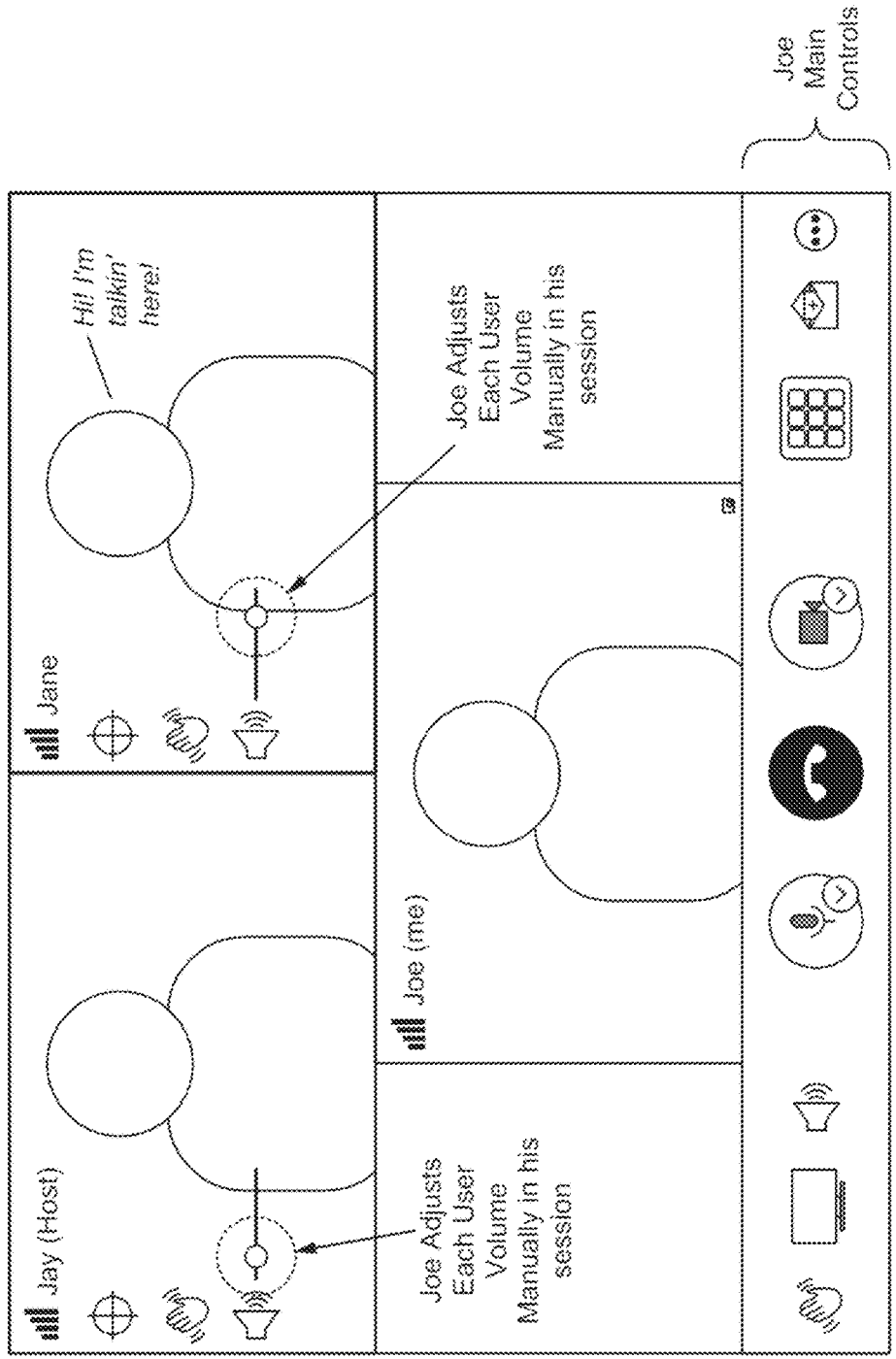

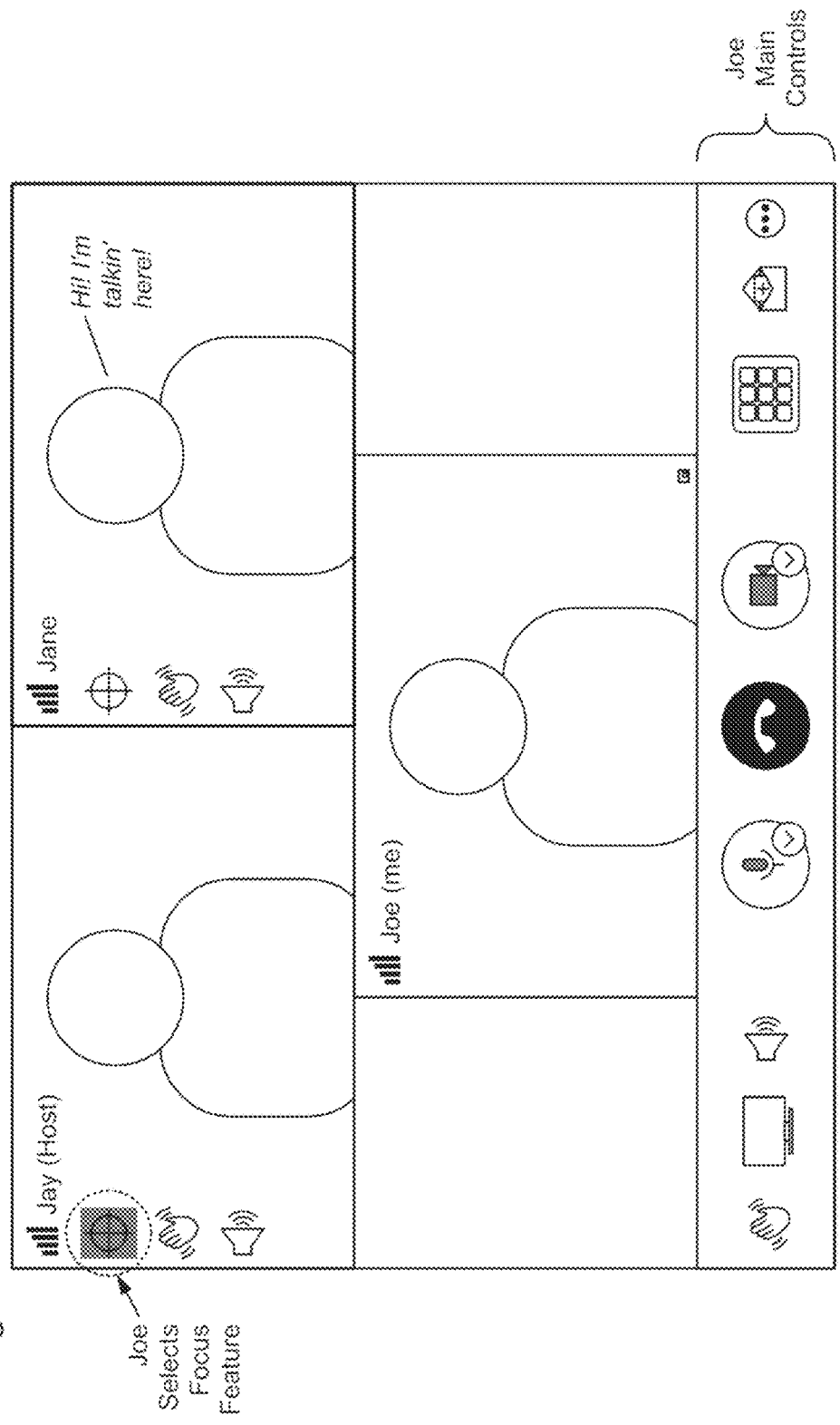

SYSTEM, METHOD, AND APPARATUS FOR SELECTIVE PARTICIPANT INTERACTION IN AN ONLINE MULTI-PARTICIPANT GATHERING SPACE

CROSS-REFERENCE TO RELATED APPLICATION

This application claims the benefit of priority of U.S. provisional application Ser. No. 62/705,167, filed 14 Jun. 2020, the contents of which are herein incorporated by reference.

BACKGROUND OF THE INVENTION

The invention relates to video communication systems, and more particularly to controlling interactions in a multi-participant video communication session.

Video communication systems that currently exist in the art are generally designed for business collaboration, and hence provide a more structured environment with a presenter leading the conversation. This design of video communication system impedes the free flow of dialog and interactions, which impedes the exchange of ideas between participants.

There exists a need for a video communication system designed not only for the traditional meeting structure, but also for a plurality of unstructured engagements that fosters various forms of selective interacting and communicating. The present invention provides solutions to such needs by offering a video communication system that more accurately replicates an informal, in-person gathering where participants can selectively engage certain individuals, as well as selectively engage certain group conversations.

In such engagements with unstructured communication as described herein, situations arise within a single gathering or session, which are attended by multiple participants or users, and a portion of the users want to have a separate conversation from the rest of the users in the session. Various video communication systems in the art provide separate sessions in which users can have smaller conversations separate from the larger group; however, in the prior art, users in one session cannot hear or see users in a different session. For instance, the prior art comprises features that mute certain users as perceived by other users in a session.

There exists a need for a video communication system that allows for separate conversations within the same session, while still allowing all participants in the same session to hear and see each other. There also exists a need that, when a user is having a separate conversation but can still hear other users that are not part of the separate conversation, the volume of that audio coming from those users that are not part of the separate conversation will sound lower but not muted to the user having the separate conversation, so as to not distract the user from their own conversation, yet allow them to perceive all participants of the main session. In this way, users can focus their attention to certain conversations and events in the video call without muting other users. There also exists a need that, when users are having a separate conversation, other users that are not a part of that separate conversation hear the users that are having the separate conversation at a lower volume.

Fulfilling these needs creates the virtual equivalent of a large gathering in one room, with multiple groups of participants having different conversations in various parts of the room. Each participant can hear and see all other participants, but participants in the same conversation will be focused on each other and will hear each other at a louder volume than they hear the other participants in the room. Furthermore, participants in one conversation will focus their vision on the participants in their conversation, even though all other participants are visible. Participants are free to actively select which other participants and/or conversations to focus on, which creates a more natural, unstructured video communication environment.

SUMMARY OF THE INVENTION

In one aspect of the present invention, a method for dynamically associating a plurality of users in a multi-user event who are each utilizing one of a plurality of user devices, the method includes the following: receiving, at each user device, a plurality of media streams, each of the plurality of media streams corresponding to a respective one of the plurality of users; each user device configured to access each media stream via a tile represented on a graphical user interface to the user device, wherein a prominence of each tile is based on a focus relationship between said user device and said media stream, and wherein each tile provides a focus control to unilaterally define said focus relationship, whereby no request nor permission is required between user devices to define said focus relationship.

The method of the present invention is embodied in a system can be adapted to receive one or more media streams from the user devices and can analyze these streams to determine audio characteristics. More particularly, the system can be adapted to determine any changes in volume level of audio signals received from the plurality of users and the like. Because one or more users participating in the method may have an audio input component (e.g. transducer, microphone, etc.) and a video capture component (e.g., webcam) active on their respective user devices, the media streams can be a culmination of one or more signals provided by these components. In at least one embodiment, the system can receive the audio portions of the media streams from the user device, and can analyze the audio signals to determine or identify changes in volume (e.g., by continuously monitoring the audio streams).

In another aspect of the present invention, the method provides wherein each of the plurality of media streams includes at least one of an audio stream and a video stream, wherein an output of the media stream is a function of the prominence; associating, at each user device, the plurality of users into a plurality of groups based the respective focus relationship, wherein the plurality of groups includes one or more focused groups and one unfocused group, wherein the prominence associated with the unfocused group comprises a non-zero unfocused volume of the respective audio streams and a thumbnail view of the respective video streams, wherein the prominence associated with the focused group comprises a focused volume of the respective audio streams and a focus view of the respective video streams, wherein the focused volume is substantially greater than the non-zero unfocused volume, and wherein the focus view is substantially greater than the thumbnail view, and wherein the focus view of a two-user focused group is a full screen view.

In yet another aspect of the present invention, a video communication system that allows users to focus on one another to create focused groups. The effect of these focused groups is the virtual equivalent of being in the same physical room as all users while having separate conversations in different areas of the room.

Using a focus feature of the invention, users can focus on other users, and thus hear those focused users at a greater volume than unfocused users, as well as see the focused users as larger than the unfocused users. All users can still see and hear all other users, albeit at different volumes and sizes. Unfocused users may be aware that other users are focused on one another and can selectively focus on said users to join their conversations. Other embodiments of the invention prevent unfocused users from knowing that other users are focused on one another, as well as preventing unfocused users from focusing on a user in a private conversation. The present invention also includes various controls to allow users to adjust the volume of specific users, as perceptible to the user adjusting the volume, wherein said focus relationship is defined by way of a command to at least one of the plurality of user devices. Such commands may be electrical, physical, or any form of signal readable by a computing device of the like.

These and other features, aspects and advantages of the present invention will become better understood with reference to the following drawings, description and claims.

BRIEF DESCRIPTION OF THE DRAWINGS

FIGS. 3A, 3B, 4A, 4B, 5, and 6 are screenshots of user interfaces which illustrate the functionality of certain controls.

FIGS. 7A, 7B, 7C, 8A, 8B, 8C, and 8D are screenshots of user interfaces which illustrate the functionality of the focus control, as well as other controls.

DETAILED DESCRIPTION OF THE INVENTION

Figure 1:
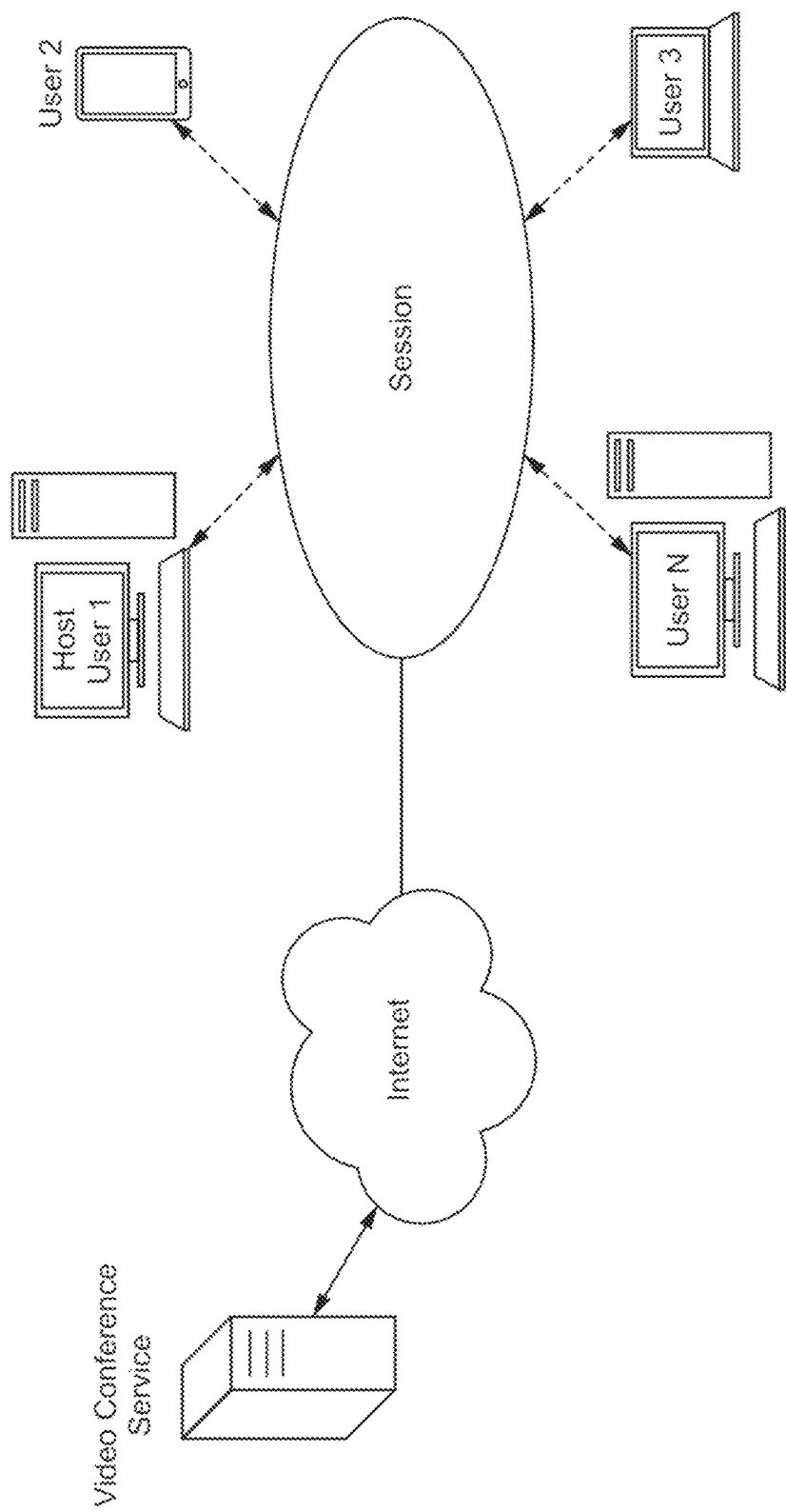
FIG. 1 illustrates a video communication system with a server connected to the internet, a session being provided by the server, and users using devices to access the session.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following terms are defined herein. These definitions are intended to aid in understanding the written description of the invention and are not to be interpreted as to limiting said terms to specific definitions.

User—one who uses the invention to communicate with other users.

Session—part of the invention comprising a video and audio communication platform in which users can virtually interact with one another through sharing of video and audio.

Session Window—portion of a user's device that is dedicated to the visual output of the session to said user.

Tile—a designated section of the session window that displays the video input of a user.

Focus—any action taken by a user or moderator to increase the prominence of one or more users or moderators by means of but not limited to automatic adjustments of audio and/or video, and simultaneously decreasing the prominence of one or more other users.

Focusing User—any user that focuses on another user or users.

Focused User—any user that is focused on by another user or users.

Unfocused User—a term used in the perspective of a specific user to describe another user that is not focused on by said specific user.

Focused Group—conversation within a session that occurs when at least two users are focused on one another.

Un-Focus—any action taken by a user or moderator to decrease the prominence of other users or moderators by means of but not limited to automatic adjustments of audio and/or video.

Focused View—view of the session window seen by a focusing user.

Full View—subset of Focused View that occurs when a focused user focuses on only one other user.

Full Screen View—synonymous with Full View.

Fullscreen Mode—view that occurs when the session window takes up the entirety of a display of a user's device.

Host—user in a session that initiates the session.

Moderator—user in a session with privileges/controls not given to other users, including but not limited to: controlling or muting/unmuting the audio and visual output of the system that is seen and heard by other users, controlling the focus of other users, creating, dissolving, and rearranging focused groups, accepting users into a session, removing users from a session, and adjusting the volumes of certain users as heard by other users.

Wave—any action taken to send alerts and notifications in order to catch the attention of another user.

Device—any computer that comprises programmable product including machine-readable program code for causing, when executed, the computer to perform steps. The programmable product may include software which may either be loaded onto the computer or accessed by the computer.

System Overview, Controls, and Features

FIG. 1 illustrates the present invention as a video communication system comprising a server connected to the Internet, users using devices to access the video communication system via the Internet, and the session, which is accessible by multiple users from multiple devices, and serves as the virtual gathering place where users can speak and listen to one another. The illustration in FIG. 1 is not intended to describe a limit to the number of users or devices that may access the session at one time. The definition of "device" provided herein is not intended to limit a device to any specific computer. Such computer may include but is not limited to a desktop, a laptop, a smart device such as a tablet or smart phone, any type of computer system or programming or processing environment, or a computer program which exists alone or in the conjunction with hardware. Though FIG. 1 illustrates the video communication system being accessed via the Internet, the video communication system may also be accessed by an extranet, intranet, host-server, internet cloud, and the like. The video communication system may also be implemented in software stored on a non-transitory computer-readable medium and executed as a computer program on a general purpose or special purpose computer.

Within each session of the invention, one user is designated as the host. The host is the user that initiates the session. All users, including the host, have equal privileges within the session, except that only the host has the privileges to allow users to enter the session and to remove other users from the session. It should be noted that the host does not act as a moderator, which has been defined herein. Other embodiments of the present invention comprise one or more moderators. The list of additional privileges/controls attributed to a moderator in the definition is not all-encompassing. Some embodiments may include additional moderator privileges/controls, while other embodiments may only include some of the privileges/controls mentioned in the definition.

Figure 2:
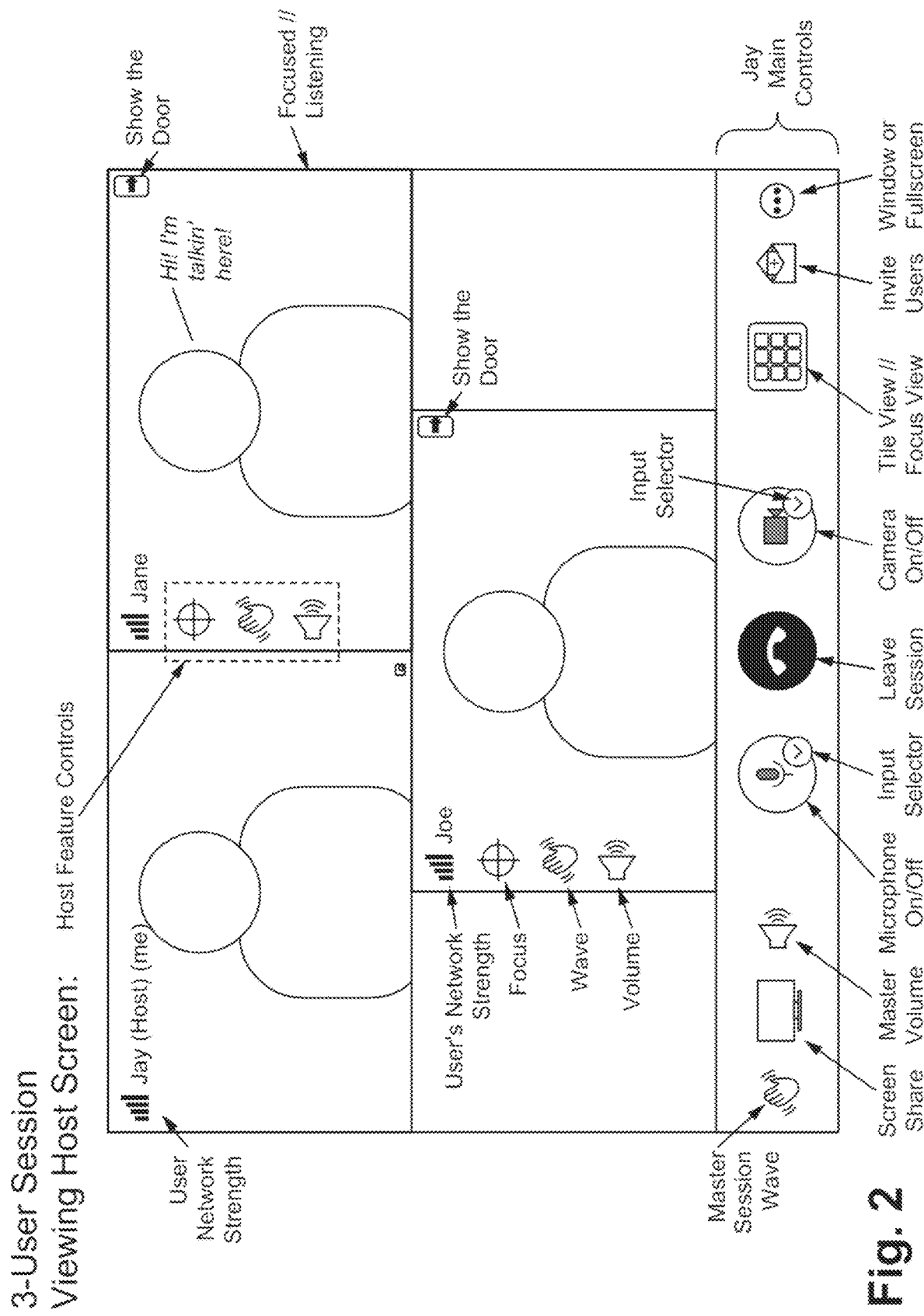
FIG. 2 is a screenshot of a user interface which illustrates various controls available to the user.

FIG. 2 illustrates a 3-user session from the host's point of view. The host sees each user that is participating in the session in a different tile on the session window. A user's tile is a designated section of the session window that shows the video input from that user. The host is also displayed in their own tile on the session window. Within the host's tile, the host may have the User Network Strength indicator available, which allows the host to view the quality of their own video that is sent to and received back from the server. The User Network Strength indicator is also available in the tiles of all other users, so that the host can view the quality of each user's video input and output with the server.

Within the tile of each user from the perspective of the host, the User Feature Controls and Host Feature Controls are available. The User Feature Controls comprise the Wave, Focus, and Volume controls. The Host Feature Controls comprise the User Feature Controls, with the addition of the Show the Door control. Other embodiments may include a Text Chat control and moderator controls.

Some embodiments comprise an announcement feature, wherein when selected by a host and/or moderator, said host's and/or moderator's audio and video input increases in prominence as heard by all other users in the session.

Also illustrated in FIG. 2, in addition to the Host Feature Controls and User Feature Controls, the Main Controls are available to the host. The Main Controls comprise the Main Wave control, the Main Volume control, the Microphone On/Off control, the Leave Session control, the Camera On/Off control, the Tile View/Focus View control, the Invite Users Control, and the Window/Fullscreen control. Other embodiments of the present invention comprise a Screen Share control and a Minimize/Maximize control.

FIG. 3A illustrates the same 3-user session as FIG. 2, except from a non-host user's point of view. All controls that are available to the host are available to each non-host user, except for the Show the Door control. In other embodiments, other features exist that are also unique to the host and/or moderator.

When the Show the Door control within a certain user's tile from the perspective of the host is selected by the host, that user is removed from the session. For example, FIG. 3A illustrates a 3-user session with users Jay, Joe, and Jane, in which Jay is the user designated as the host. If Jay selects the Show the Door control within Joe's tile as visible from Jay's screen, Joe is removed from the session, but Jane remains in the session.

The Microphone On/Off control allows any user to toggle their own audio input to the session. When a user hovers their cursor over the Microphone On/Off control, the status of that user's audio input will be displayed. A status comprising the word "On" signifies that the user is inputting audio into the session for other users to hear. A status comprising the word "Off" signifies that the user is not sending audio into the session for other users to hear. If the status of the user's audio is displayed as "On" and the user selects the Microphone On/Off control, that user's audio status will be changed to "Off." If the status of the user's audio is displayed as "Off" and the user selects the Microphone On/Off control, that user's audio status will be changed to "On."

Some embodiments of the present invention comprise options given to a user after selecting the Microphone On/Off control that allow that user to mute their own audio as audible to the rest of the session. Such options may include an option for the user to mute their own audio as audible to everyone in the session, or to mute their own audio as audible to only that user's unfocused users. Hence, users in these embodiments have the ability to prevent all other users in the session from hearing their audio. Users in these embodiments may also have the ability to prevent their unfocused users from hearing their audio, while still allowing their focused users to hear their audio.

The Camera On/Off control allows any user to toggle their own video input to the session. When a user waves their cursor over the Video On/Off control, the status of that user's video input will be displayed. A status comprising the word "On" signifies that the user is inputting video into the session for other users to see. A status comprising the word "Off" signifies that the user is not sending video into the session for other users to see. If the status of the user's video is displayed as "On" and the user selects the Camera On/Off control, that user's video status will be changed to "Off." If the status of the user's video is displayed as "Off" and the user selects the Camera On/Off control, that user's video status will be changed to "On."

Both the Microphone On/Off control and the Camera On/Off control comprise an Input Selector. The Input selector allows any user to select the device which will capture that user's own voice or image as input and send said input to the session. Selecting the Input Selector control of the Microphone On/Off control will display a list of available microphones for the user to select. Selecting one of the listed microphones will tell the user's device to use the selected microphone to transmit the audio captured by the selected device. Selecting the Input Selector control of the Camera On/Off control will display a list of available cameras for the user to select. Selecting one of the listed cameras will tell the user's device to use the selected camera to transmit the visual input captured by the device.

The Leave Session control allows any user to leave a session. When a user selects the Leave Session control, that user will no longer be participating in the session, and will not see or hear the other users by means of the invention until they rejoin the session.

Figure 12:
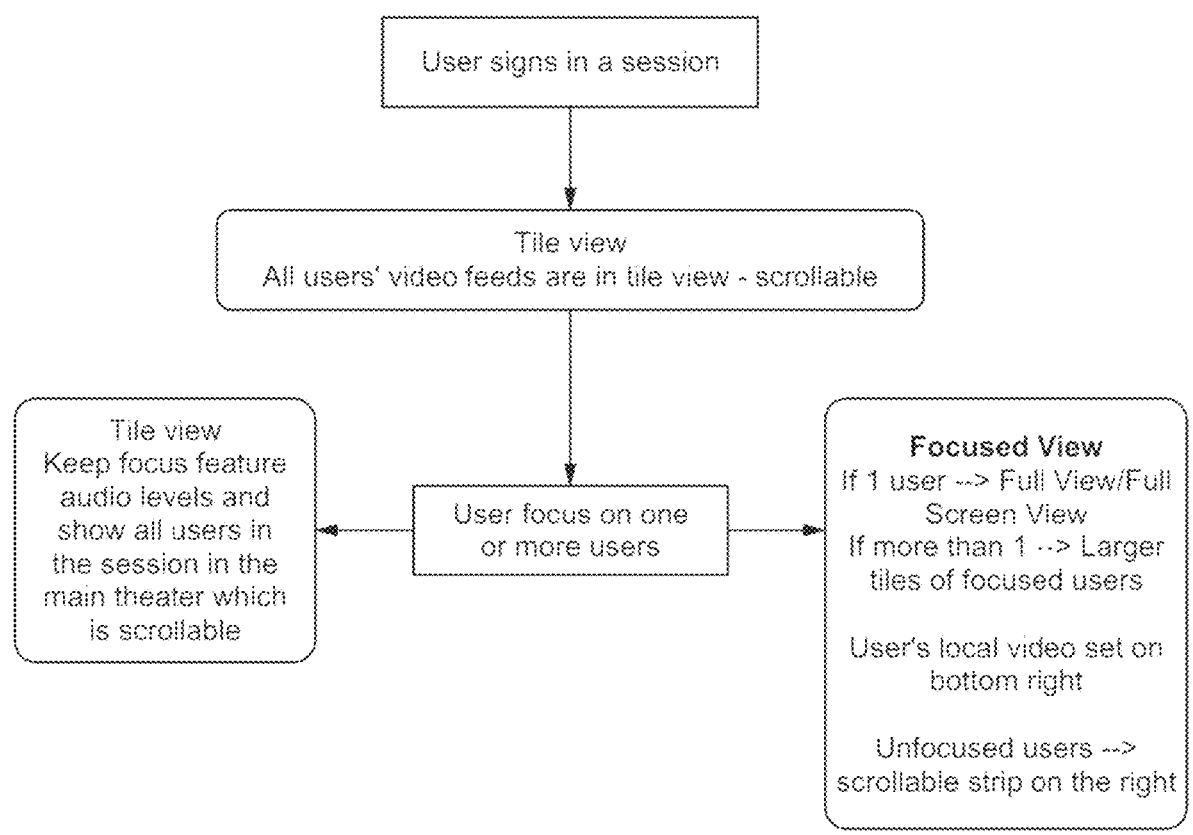
FIG. 12 is a flowchart that illustrates the various views available to the user of the invention in some embodiments of the invention.

The Tile View/Focus View control allows any user to toggle between the Tile View or Focus View, as described in the flowchart illustrated in FIG. 12.

The Invite Users control allows any user to invite other users to join the session. Selecting the Invite Users control will display multiple options of inviting other users, comprising sending a link to the session via email, sending a link to the session via a messaging application, and copying a link that can be pasted in a different application of the user's device. If a user that has been invited to the session decides to join the session, then the host and/or moderator of the session must allow that user to enter the session. Other embodiments of the invention deny certain users the ability to use the Invite Users control. In addition, some embodiments of the invention that comprise moderator controls may only allow the moderator to invite other users to the session.

The Window or Fullscreen control allows any user to toggle their own screen between Window Mode or Fullscreen Mode. Selecting Fullscreen Mode will cause the session window to take up the entire surface area of that user's screen. This is not to be confused with Full Screen View which is described above and is illustrated in FIGS. 10 and 12. Selecting Window Mode will cause the session window to take up a portion of the surface area of that user's screen.

Other embodiments of the invention comprise a Screen Share control. When any user selects the Screen Share control, all other users within the same session as the user who selected the Screen Share control can view the content of that user's screen.

Other embodiments of the present invention may include a Minimize/Maximize control. The Minimize/Maximize control allows any user to toggle between two sizes of only their own tile from the perspective of themselves. The Minimize/Maximize control does not allow users to make size adjustments to their own tile beyond the two toggleable sizes, which are Min size and Max size. The description of these sizes is not intended to describe how much space the user's tile takes up on the user's screen. Only the user that selects the Minimize/Maximize control will see the visual changes that are caused by said control.

Other embodiments of the present invention include moderator privileges/controls comprising controlling or muting/unmuting the audio and visual output of the system that is seen and heard by other users, controlling the focus of other users, creating, dissolving, and rearranging focused groups, and adjusting the volumes of certain users as heard by other users or all users. This list of moderator privileges/controls is not all-encompassing. Some embodiments may include moderator privileges/controls in addition to those mentioned herein, while other embodiments may only include only some of the moderator privileges/controls mentioned herein.

Figure 3B:
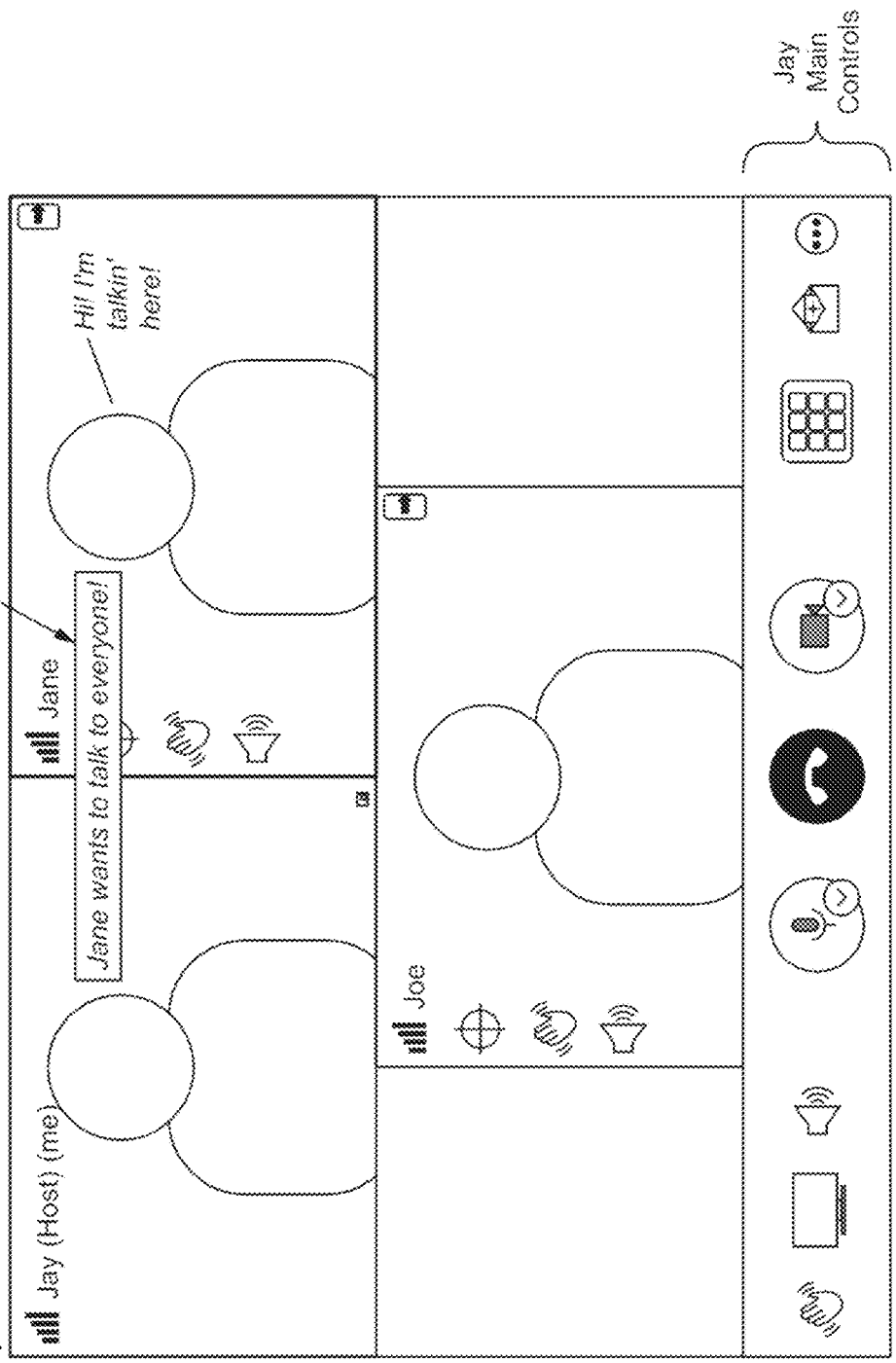

FIGS. 3A, 3B, 4A, and 4B illustrate the Wave and Master Wave controls. When any user selects the Master Wave control, that user is given the option to wave to all users in the session, or to only that user's focused users. As illustrated in FIGS. 3A and 3B, when a user selects the Master Wave control and then selects the option to wave to everyone, all other users in the session receive a notification that the user that selected the Master Wave control has waved to them. The exact wording of the notification illustrated in FIG. 3B is not intended to limit the invention to a specific wording of the notification that users receive when waved to. When a user selects the Master Wave control and then selects the option to wave to focused users, only that user's focused users will receive said notification.

Figure 4B:
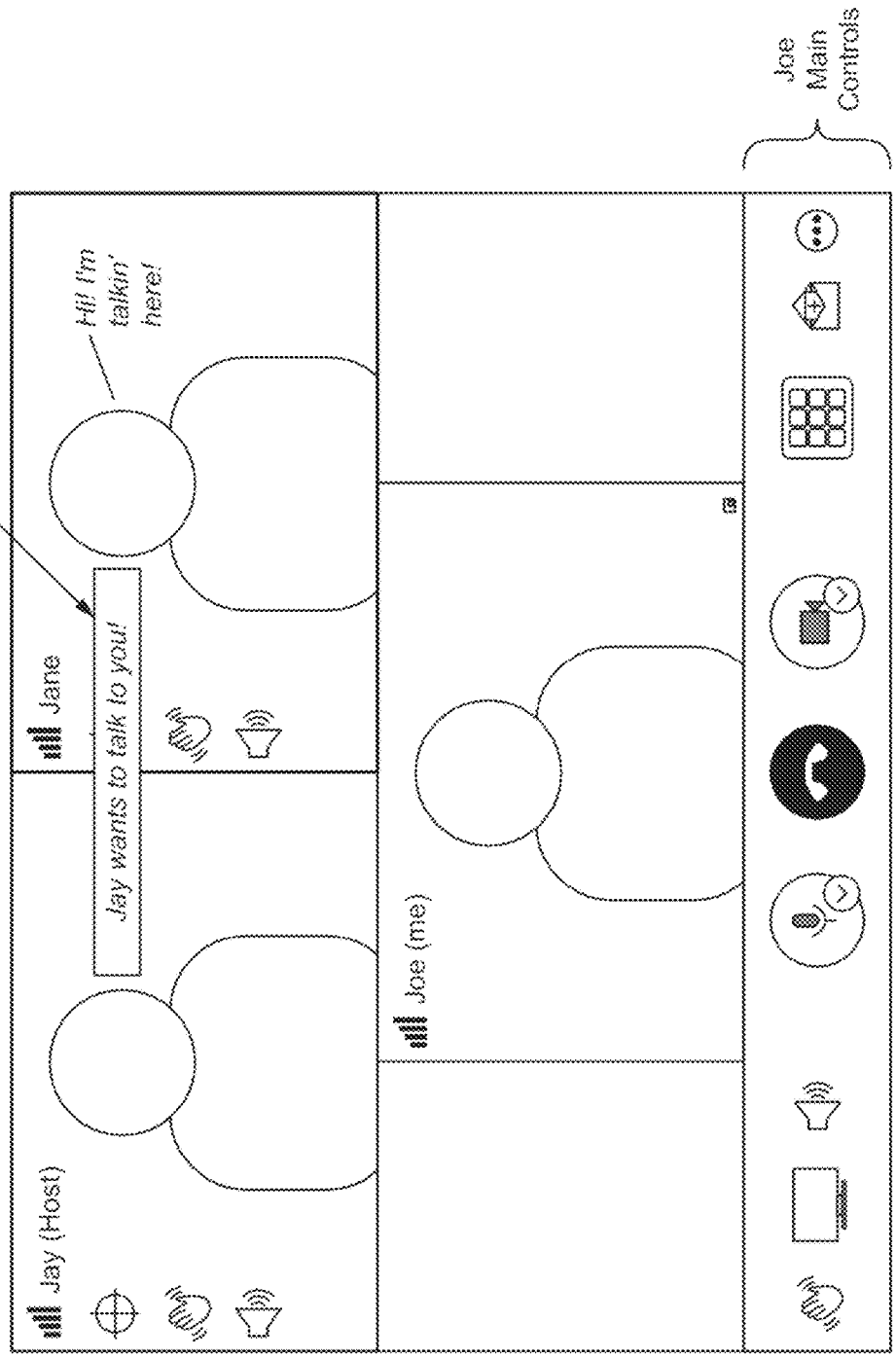

When any user selects the Wave control in another user's tile, the user that selects the Wave control waves only to the user whose Wave control has been selected. The example in FIG. 4A illustrates a 3-user session with users Jay, Jane, and Joe. In the example, Jay selects Joe's Wave control, which is the Wave control in Joe's tile from the perspective of Jay. FIG. 4B illustrates that when Joe's Wave control is selected by Jay, Joe receives a notification that Jay has waved to him. Jane does not receive this notification since Jane has not been waved to.

The purpose of the notification sent when waving to another user is to catch that user's attention. However, the Wave and Master Wave controls may be used for other purposes. Other embodiments of the invention comprise additions to the Wave and Master Wave controls that allow users or moderators to send announcements to all users within a session or to specific users within a session.

FIGS. 5 and 6 illustrate the Volume and Master Volume controls. As illustrated in FIG. 5, when any user selects the Master Volume control, that user can raise or lower the volume of all other users in the session by the same degree. In some embodiments, use of the Master Volume control raises or lowers the volume of only said user's unfocused users. As shown in FIG. 6, when any user selects the Volume control in another user's tile, the user that selects the Volume control can raise or lower the volume of only the user whose Volume control has been selected. FIG. 6 illustrates the same 3-user session as in FIG. 4A. In FIG. 6, Joe selects the Volume control in Jane's tile and the Volume control in Jay's tile, thus adjusting the volume of both Jay and Jane at different levels. In this way, the invention differs from the prior art in that users of the invention can independently adjust the volumes of other users as heard by the user making the volume adjustments.

When a user adjusts volume using either the Master Volume Control or the Volume control, only the user that has adjusted the volume will hear the difference in volume. The audio output heard by one user is not affected by the volume adjustments that another user performs via the Master Volume control or Volume control.

The Focus Control

Figure 7B:
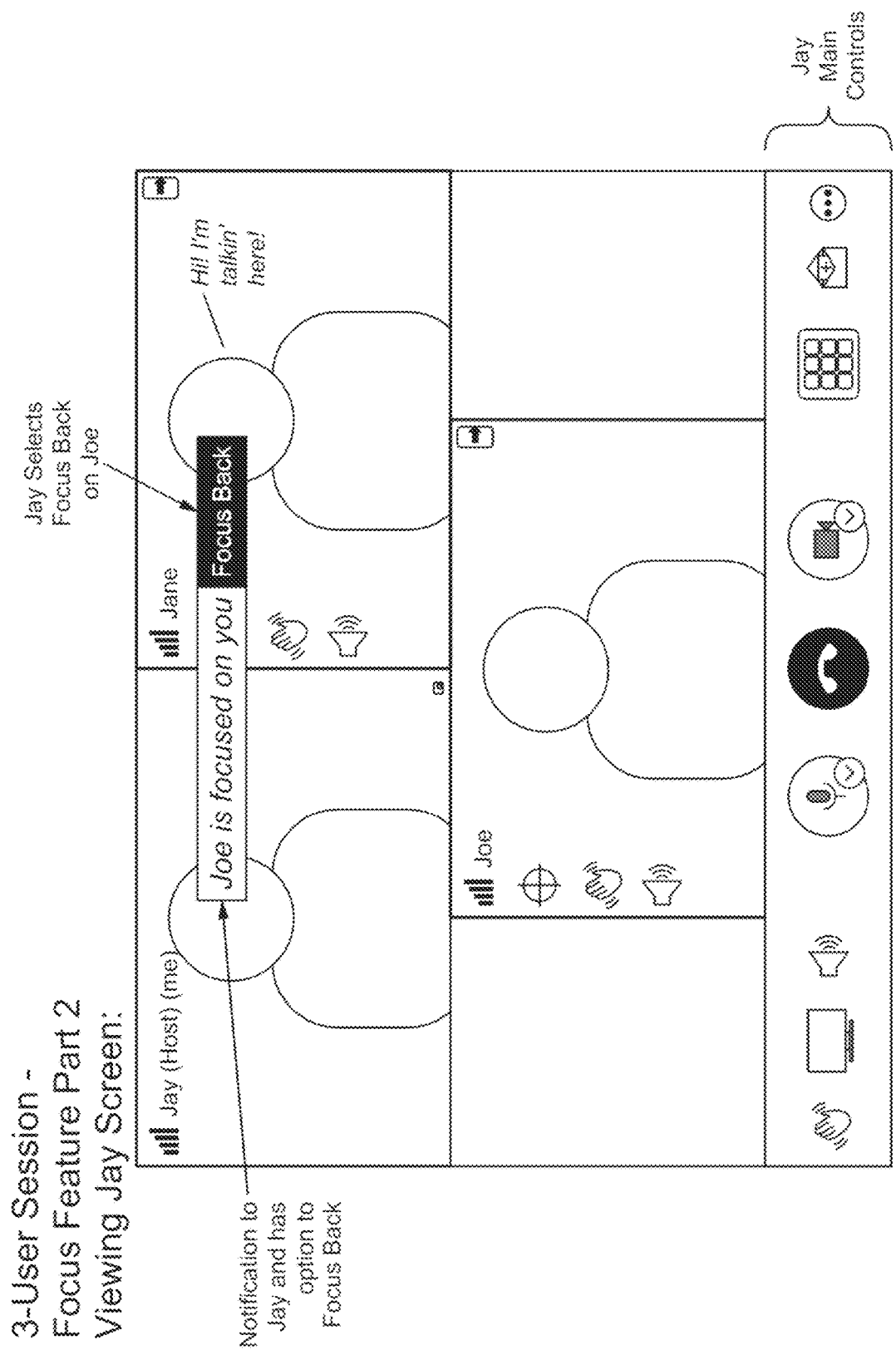
Figure 7C:
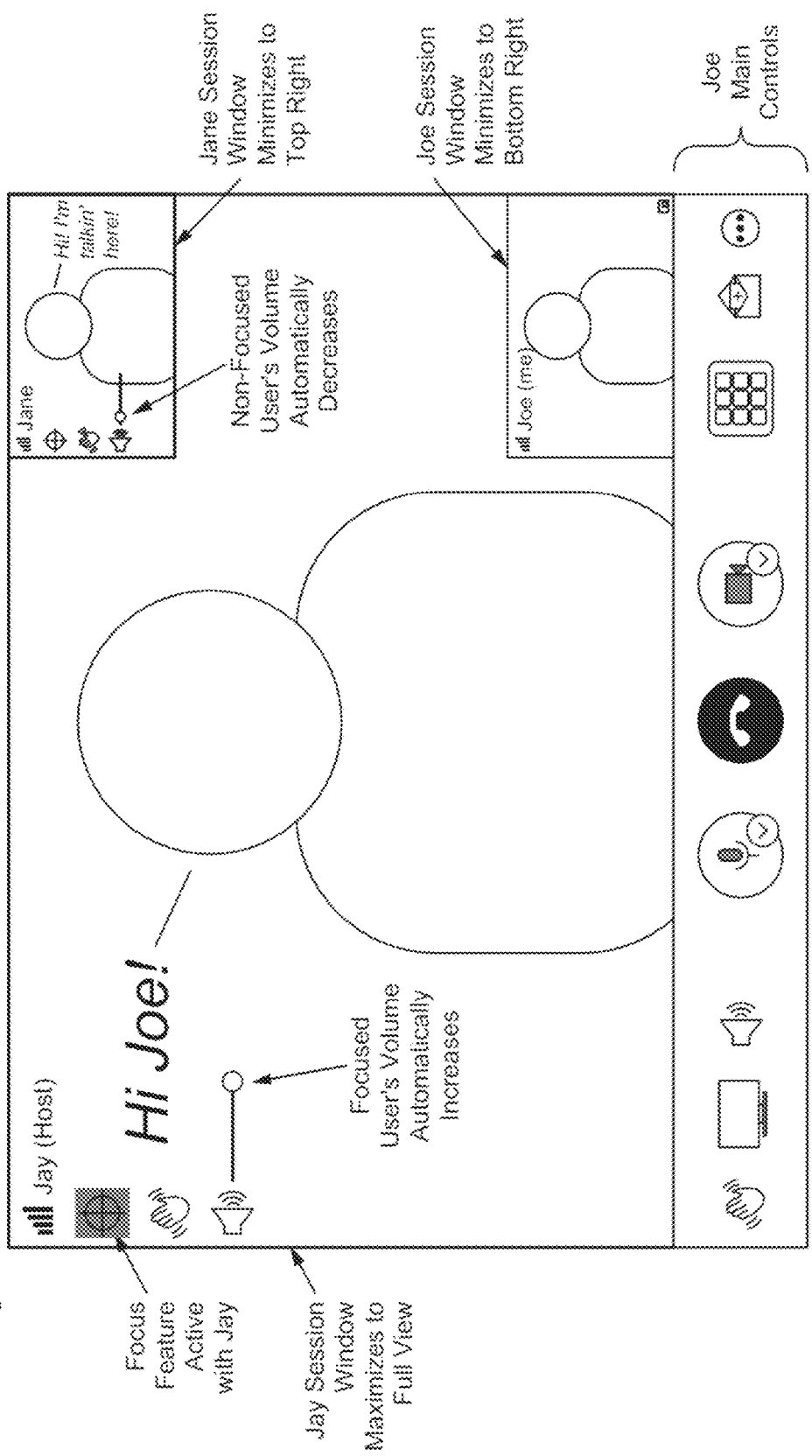

FIGS. 7A, 7B, and 7C illustrate the use of the Focus control. When any user selects the Focus control in another user's tile, the user that selected the Focus control focuses on the user whose Focus control has been selected. The user whose Focus control has been selected is now a focused user to the user that selected the Focus control. The user who selected the Focus control is now a focusing user. All other users in the session are unfocused users to the focusing user. These unfocused users can be defined as belonging to the same group, the unfocused group (of users). The tiles of focused users are larger on focusing users' screens, and focusing users hear their focused users' volumes at a higher level than that of their unfocused users. Focusing users' tiles appear with a colored border to their focused users. The present invention differs from the prior art in that all users are still visible and audible to all other users, regardless of the level of attention that certain users give to other users. Other embodiments may include functionality in which not all users can see and hear all other users.

For example, FIGS. 7A, 7B, and 7C illustrate the same 3-user session as FIG. 4. In FIG. 7A, Joe selects the Focus control in Jay's tile from the perspective of Joe, therefore focusing on Jay. Jay becomes a focused user to Joe, and Joe becomes a focusing user to Jay. FIG. 7C shows that once Joe focuses on Jay, Jay's tile appears larger than Jane's tile on Joe's screen. Joe hears Jay's volume as louder than Jane's volume. Jay sees Joe's tile with a colored border. Jay is now a focused user to Joe, and Jane is now an unfocused user to Joe.

FIG. 7C illustrates a volume of 100% for a focused user, and a volume of 5% for an unfocused user. This is not intended to limit the invention to a specific volume percentage for focused or unfocused users. Other embodiments of the invention set the volume of a focused user anywhere from 0% to 100%, and the volume of an unfocused user anywhere from 0% to 100%. These volumes can then be adjusted by the focusing user by selecting the Volume control. In this way, the invention differs from the prior art in that all users of the invention can adjust the volumes they hear from other users independently of one another. For example, in the 3-person session illustrated in FIG. 7C, Joe can lower Jay's volume and raise Jane's, even though Joe is focusing on Jay and not focusing on Jane. Only the audio that Joe hears is affected by the volume adjustments that Joe makes.

The present invention further differs from the prior art in that users do not need approval from other users and/or a moderator in order to focus on other users or to un-focus other users. For example, in the 3-person session illustrated in FIG. 7A, Joe can focus on Jay without Jay's permission or Jane's permission. Likewise, Jay and Jane can each focus on each other and/or Joe without the permission of any other user. Once Joe is focused on Jay, Joe can un-focus Jay without Jay's permission or Jane's permission. Other embodiments of the present invention may include moderators that may permit or deny the use of the Focus control by other users, as well as designate the focus of other users and create specific focused groups.

FIG. 7A illustrates the Focus control after being selected. When a user selects the Focus control in another user's tile and thus focuses on that user, the Focus control that the focusing user selected will appear highlighted. The Focus control in the focusing user's tile from the perspective of the focused user will appear to have changed color. Furthermore, a border will appear around the focusing user's tile from the perspective of the focused user. For example, in the 3-user session illustrated in FIG. 7A, Joe focuses on Jay. The Focus control in Jay's tile from the perspective of Joe will appear highlighted. The Focus control in Joe's tile from the perspective of Jay will change color. In addition, a border will appear around Joe's tile from the perspective of Jay. In this way, the present invention differs from the prior art in that users can see which other users are attentively listening to them, which puts emphasis on the listeners of a conversation instead of only emphasizing the speaker.

The present invention further differs from the prior art in that when a user is actively listening to another user, video adjustments are made in addition to volume adjustments. The video adjustments comprise those which have been previously described, which are the change in size of the focused users' tiles, the appearance of the focused user's Focus controls, the appearance of the focusing users' Focus controls, and the appearance of the borders of the focusing users' tiles. This is not intended to be an all-encompassing list of video adjustments that may occur when a Focus control is utilized during a session. Other embodiments of the present invention may comprise additional and different visual adjustments when a Focus control is utilized during a session.

In the example illustrated in FIG. 7A, Jane will not see any of the visual changes described in the above paragraph, since she has not focused on either Joe or Jay, and neither Joe nor Jay have focused on Jane.

When a user focuses on another user, the focused user will receive a notification that a user has focused on them. That notification will give the focused user the option to focus back. By focusing back, the focused user can also focus on the focusing user. If the focused user selects this option, then both the focused user and focusing user are now considered focused users and focusing users, since they are both focusing and being focused on. For example, FIG. 7B illustrates the same 3-user session as FIG. 7A. Joe focuses on Jay, which causes Jay to receive a notification that Joe has focused on him. This notification gives Jay the option to focus back. If Jay selects the option to focus back, Jay will be focused on Joe. Jay is now a focused user to Joe, and Joe is now a focused user to Jay. Jay is now a focusing user to Joe, and Joe is now a focusing user to Jay.

It is important to note that permission is not required for a user to focus or un-focus on another user or users. Any user can focus or un-focus on any other user or users at any time without said user or users' permission. Other embodiments of the invention comprise moderator controls that allow moderators to permit and deny permission for users to focus and un-focus on other users. Embodiments of the invention that comprise moderator controls may allow moderators to create focused groups and assign users to focused groups, hence dictating the focus of said users. Further embodiments may allow users to make themselves unavailable to be focused on, hence limiting other users in their ability to choose who to focus on.

When a user focuses on another user and that other user focuses back, the two users are in a focused group. A focused group comprises at minimum two users focusing on each other. Focused groups can also comprise more than two users focusing on one another. For example, in FIG. 7A Joe focuses on Jay. Joe is focused on Jay, but they are not in a focused group unless Jay also focuses on Joe. If Jay does focus on Joe, Jay and Joe are now in a focused group, since both are focused on each other.

When a user focuses on multiple users, those focused users' tiles appear the same size on the focusing user's screen, which is a larger size than the tiles of the unfocused users. The volume of the focused users will be the same level in the perception of the focusing user, which is louder than the volume of the unfocused users. These volume levels can be adjusted with the Volume control.

In some embodiments of the invention, when at least two users are in a focused group and another user focuses on one of the users in the focused group, that other user is then prompted to join the focused group, and thus automatically focus on all users in that focused group. In addition, all users in the focused group will automatically focus on the user that has just joined the focused group. For example, in the session illustrated in FIG. 8A, Jay and Joe are in a focused group of which Ann and Jane are not a part. Ann focuses on Jay. Since Jay and Joe are in a focused group and Ann has just focused on Jay, Ann is now prompted to join the focused group. Ann decides to join the focused group, and thus automatically focuses on all users that are a part of that focused group, which in this example include Joe and Jay. Joe and Jay will also automatically focus on Ann, since she has joined their focused group. In FIG. 8B, Ann's screen is illustrated with Jay's tile and Joe's tile being the same size, which is larger than Jane's tile, since Jane is an unfocused user to Ann. Ann can still hear and see Jane. In this way, the present invention simulates a non-virtual situation in which a person approaches one member of a conversation, and thus listens into the entire conversation. This feature of automatically joining a side conversation while staying in the same video communication session is one way in which the invention differs from the prior art.

Figure 8A:
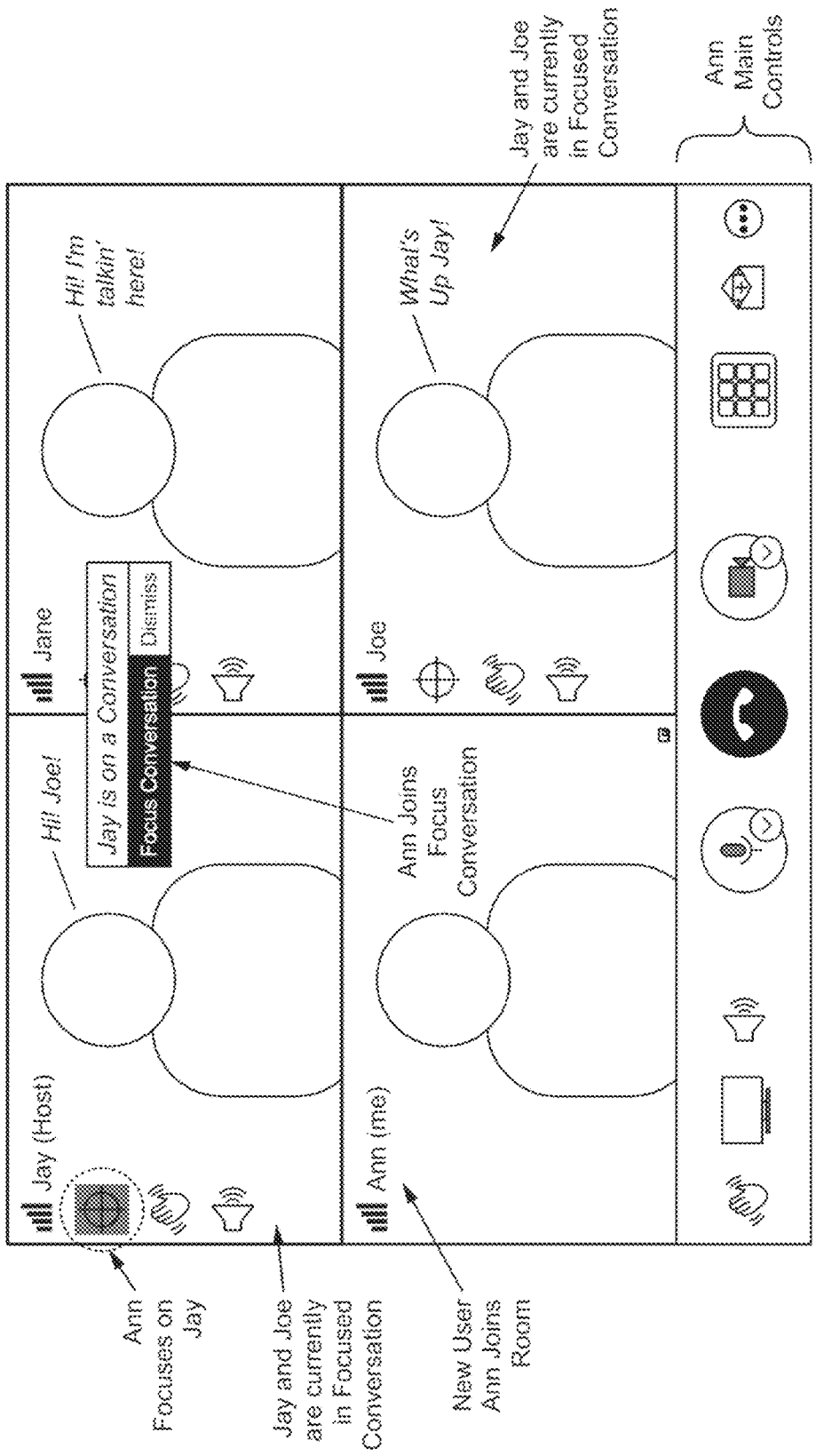
Figure 8B:
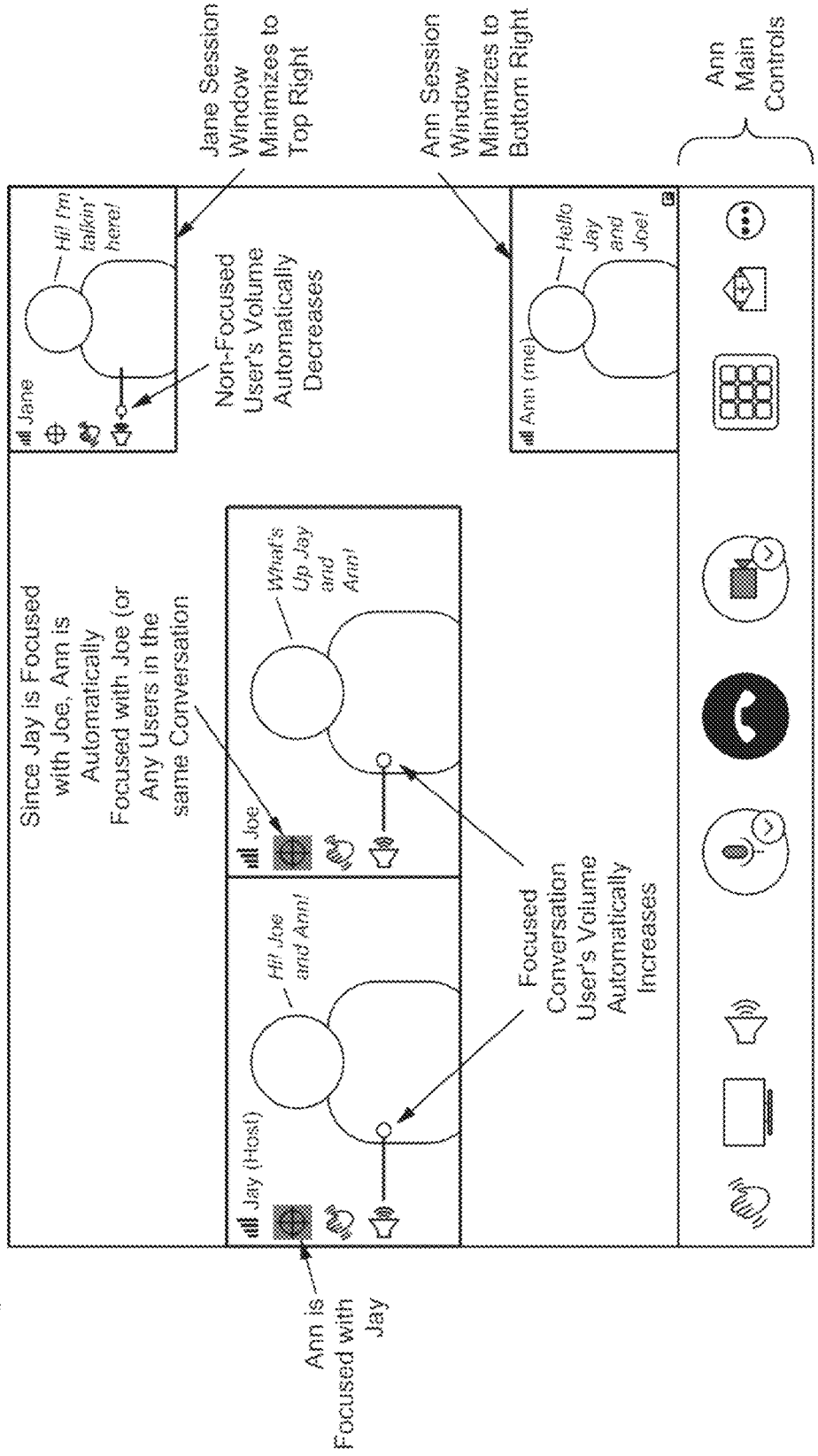
Figure 8C:
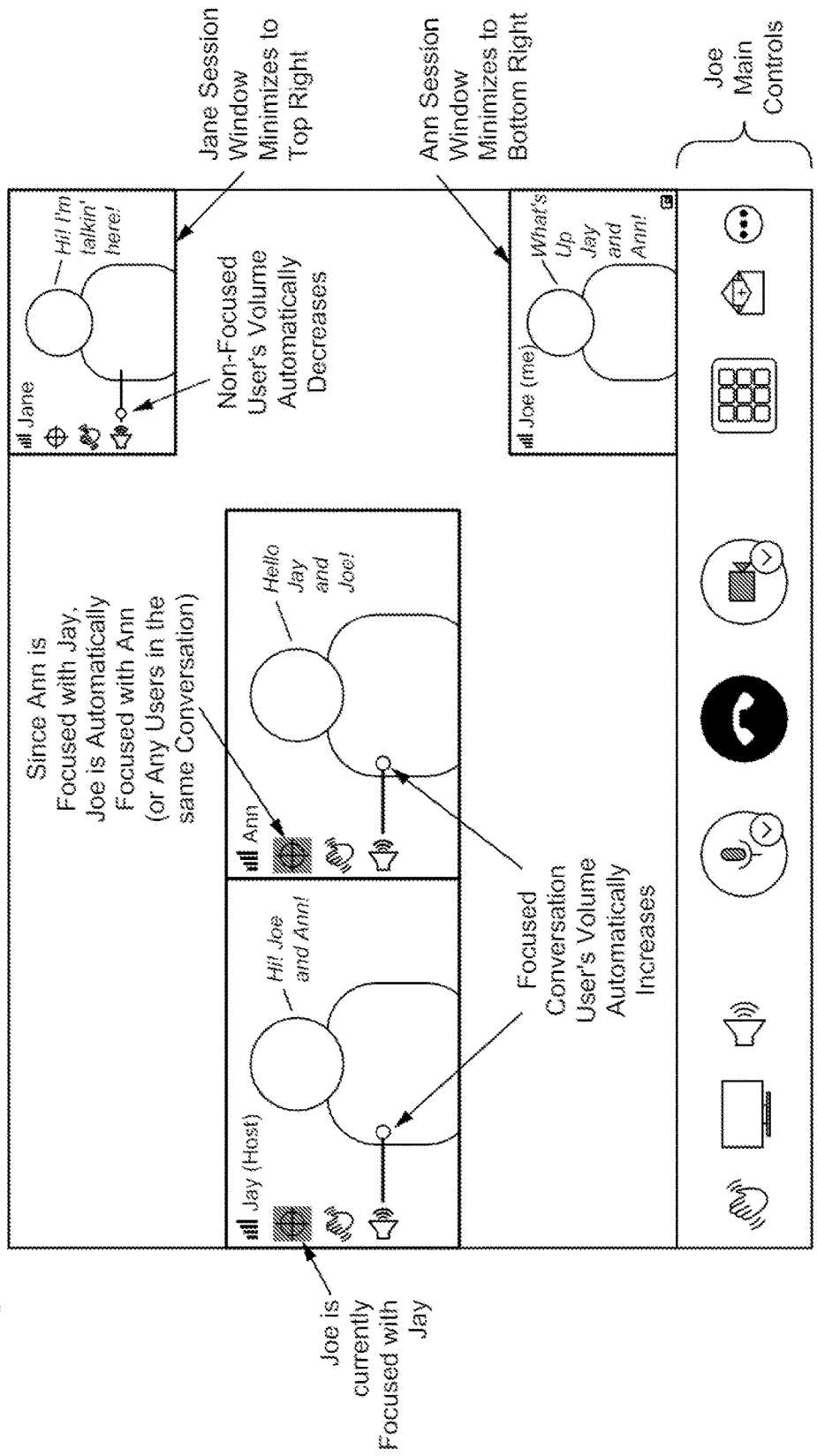

In some of the embodiments illustrated in FIGS. 8A and 8B, if Ann had chosen not to focus on Joe, she would have remained focused on Jay, but unfocused on Joe. She would not have been part of the focused group between Jay and Joe until she chose to focus on Joe as well.

Any focusing user can un-focus any of their focused users through a number of methods within the session, including but not limited to selecting the Focus control in a focused user's tile and double-clicking a focused user's tile. When a focusing user un-focuses one of their focused users, that focused user becomes an unfocused user to the focusing user. The tile size and volume of that unfocused user becomes the same as the tile sizes and volumes of the other unfocused users as visible and audible to the focusing users. Some embodiments of the invention comprise moderator controls which allow moderators to permit or deny users to un-focus other users.

Figure 8D:
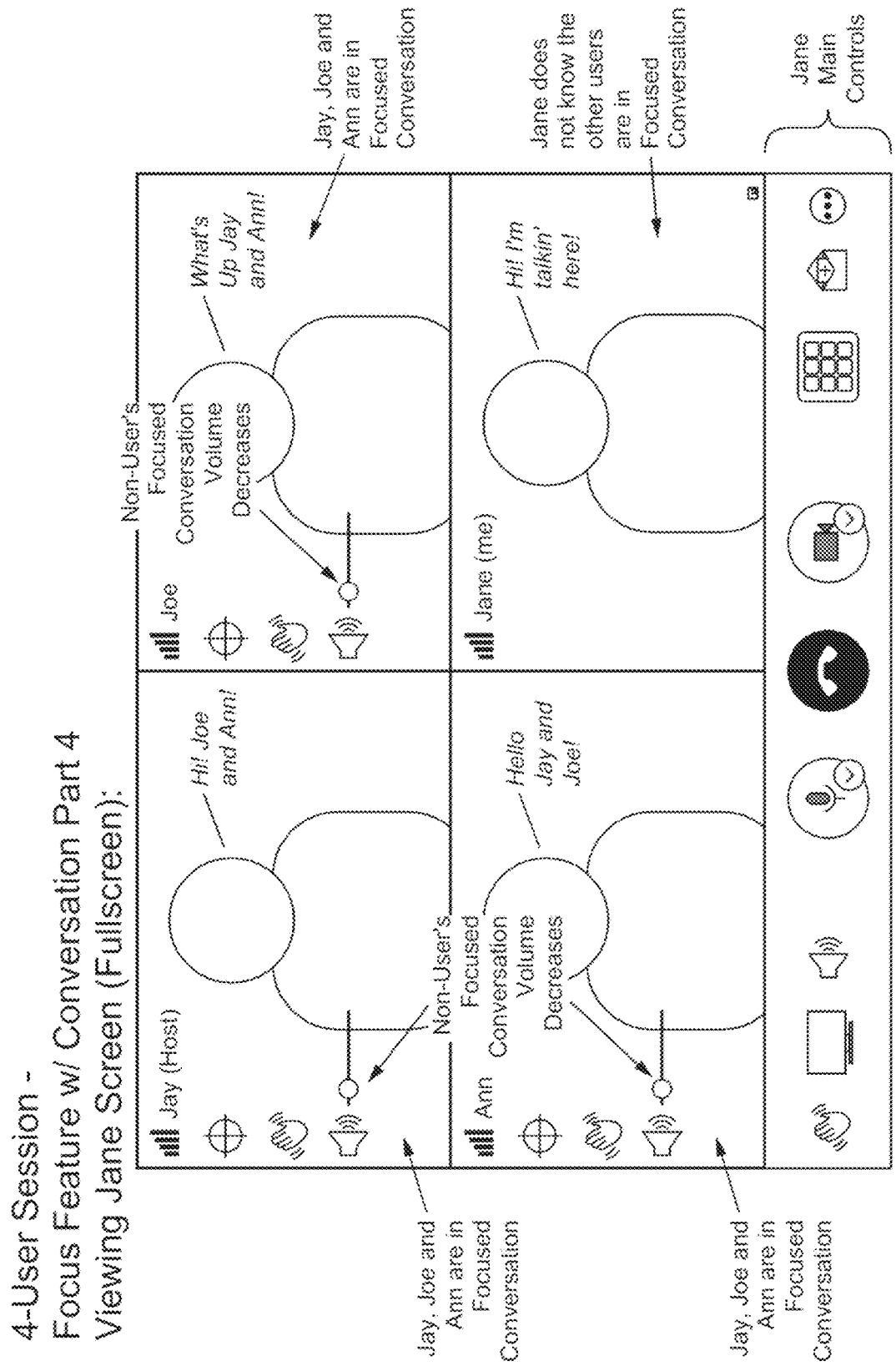

Unfocused users can still see users that are focused on other users at the same size as if none of the users were focused on one another. Unfocused users can also still see users that are in a focused group at the same size as if none of the users were focused on one another. This is illustrated in FIG. 8D, where Jay, Joe, and Ann are in a focused group, and Jane is not in the focused group. Jane sees the tiles of Jay, Joe, and Ann as equally sized. In this way, the present invention differs from the prior art in that users that are not part of a side conversation can still see the participants of that side conversation.

If a focused group is happening in a session and there are unfocused users that are not part of that focused group, the unfocused users will still hear the users that are participating in the focused group, albeit at a lower volume. This gives the effect of a side conversation happening at a different area of a physical gathering room, where it can still be heard by all, but those not actively part of the conversation hear that conversation at a lower volume. In the example in FIG. 8D, Jane can still hear Jay, Joe, and Ann, but the volumes of Jay, Joe, and Ann will sound lower to Jane than if they were not in a focused group. In this way, the present invention differs from the prior art in that users that are not part of a side conversation can still hear the participants of that side conversation, albeit at a lower volume.

Unfocused users may be aware that focused conversations of which they are not a part are taking place in the session. Other embodiments of the invention comprise functionalities to keep unfocused users from knowing that focused groups of which they are not a part are taking place in the session.

In the example illustrated in FIG. 8D, Jane can join the focused group by focusing on either Jay, Joe, or Ann.

Any user can focus on any other user or users given that said users are participating in the same session. In this way, the present invention differs from the prior art in that users that are actively speaking or dominating the conversation do not necessarily appear prominent in the session to all other users. Furthermore, the ability of any user to focus on any other user or users in the same session may present a situation where the users that are actively speaking do not necessarily appear prominent in the session to any user.

It is important to note that the terms focused user, focusing user, and unfocused user are relative to each particular user of a session. For example, in the 3-user session illustrated in FIG. 8D, Jay is a focused user to Joe, but Jay is not a focused user to Jane. Joe is a focusing user to Jay, but Joe is not a focusing user to Jane. Jane is an unfocused user to both Joe and Jay. In this way, each user has some level of control of independently adjusting the prominence of other users in a session from their own point of view.

It is also important to note that other methods of focusing are available other than selecting the Focus control in another user's tile. Selecting the Focus control is one method that is described in order to demonstrate the concept of focusing and the audio and video adjustments that are made when focusing occurs within a session. Other methods of focusing include but are not limited to double-clicking another user's tile. Any method of focusing will have the same effects as selecting the Focus control.

Further Descriptions of Embodiments of the Invention

Figure 9:
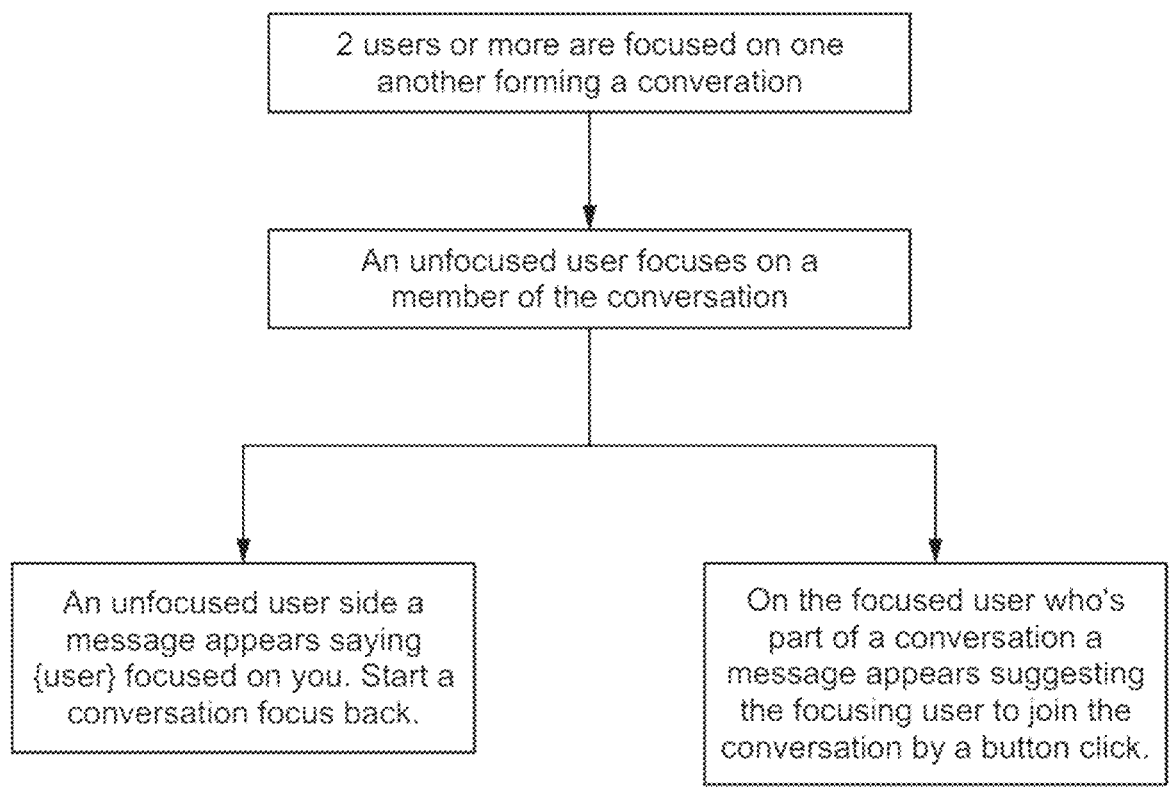
FIG. 9 is a flowchart that illustrates the functionality of the focus control in some embodiments of the invention.

FIG. 9 is a flowchart that illustrates a scenario in which multiple users are in a session, and 2 or more of those users are in a focused group. Another user that was not originally part of that focused group focuses on one of the users that is in the focused group. The user that has just been focused on receives a message saying that the unfocused user has focused on them. If the user that has just focused on one user of the focused group decides to join the entire focused group, then all users in the focused group will automatically focus on that user that joins.

Figure 10:
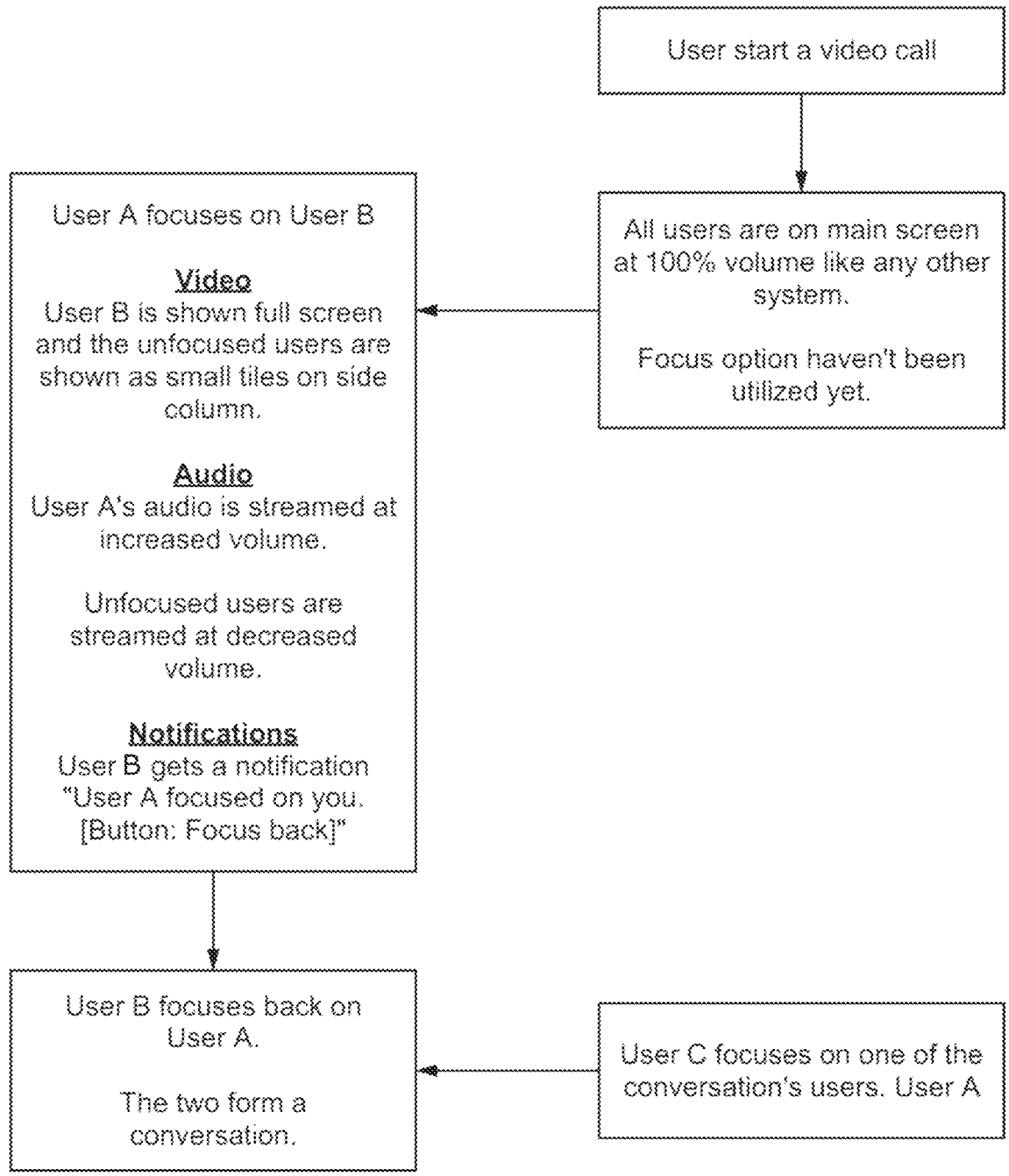
FIG. 10 is a flowchart that illustrates users focusing on one in another in one embodiment of the invention.

FIG. 10 is a flowchart that illustrates an example of users, in a session of certain embodiments of the invention. Three of these users are User A, User B, and User C. When the session is first started and none of the users have focused on any of the other users, then each user hears all other users at the same volume. When User A focuses on User B, then User B's tile appears larger on User A's screen. Since User B is User A's only focused user, User B's tile will take up the entirety of User A's session window. This is defined as Full Screen View, which is further illustrated in FIG. 12. User B's tile becomes the background of User A's session window. User C's tile and User A's own tile are shown smaller than User B's tile on User A's screen and are shown in the foreground of User A's screen. This allows User A to see themselves and User C while they are focused on User B, even though User B's tile takes up the entirety of the session window on User A's screen.

In the embodiment of the invention illustrated in FIG. 10, once User A focuses on User B, User A hears User B's volume at a higher volume and User C's volume at a lower volume. Once User A focuses on User B, then User B receives a notification that User A has focused on them, and gives User B the option to focus back on User A. Once User B focuses back on User A, the two are in a focused group since both users are focused on each other. User C then focuses on User A. User C now has the option to stay focused on only User A, or to join the focused group. If User C choses to join the focused group, they will automatically focus on User B, and Users A and B will automatically focus on User C.

Figure 11:
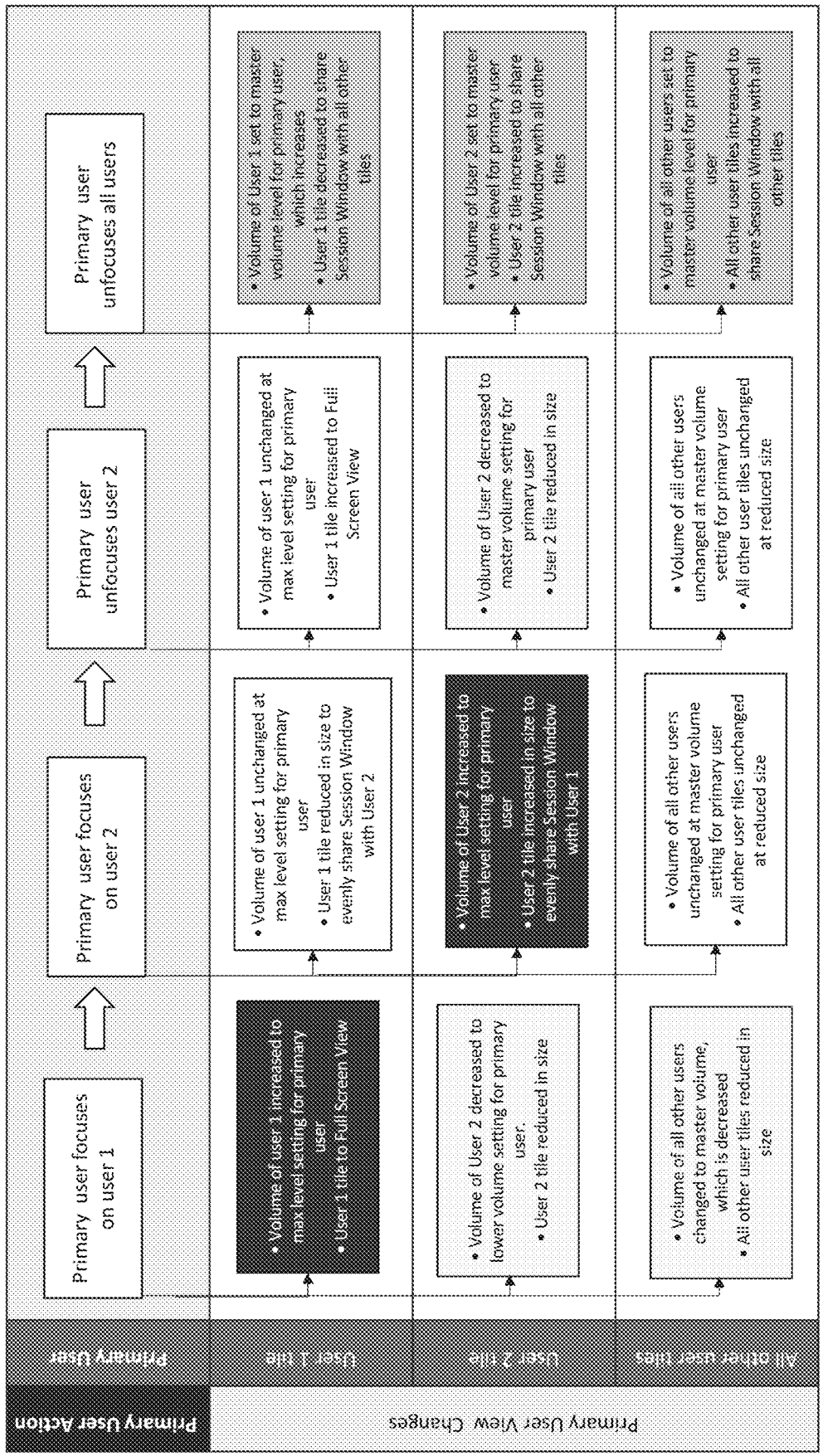
FIG. 11 is a flowchart that illustrates the perspective of a user when focusing occurs in a session in some embodiments of the invention.

FIG. 11 is a flowchart that illustrates the perspective of a user when focusing occurs in a session of some embodiments of the invention. The first row in the flowchart illustrates actions performed by one user herein referred to as Primary User. The remaining three rows of the flowchart illustrate how Primary User views and sees the other users in the session after performing each action. These other users are herein referred to as User 1, User 2, and "all other users", with "all other users" representing all users in the session that are not Primary User, User 1, or User 2. The perspectives illustrated in each column of the flowchart are caused by the action performed by Primary User in said column of the flowchart.

In the first column of the flowchart in FIG. 11, Primary User focuses on User 1. User 1's volume then increases to the maximum level from the perspective of Primary User. User 1's tile is displayed in Full Screen View from the perspective of Primary User. User's 2's and all other users' volume decreases to a lower volume setting, and their tiles are reduced in size from the perspective of Primary User, since Primary User is not focusing on them.

In the second column of the flowchart in FIG. 11, Primary User focuses on User 2 after focusing on User 1. Now Primary User is focused on both User 1 and User 2. User 1's volume remains the same from the perspective of Primary User, and User 1's tile reduces in size from the perspective of Primary User. User 2's volume increases to the max level setting from the perspective of Primary User, and User 2's tile increases to be the same size as User 1's tile from the perspective of Primary User. The volume and tile sizes of all other users remain unchanged from the perspective of Primary User.

In the third column of the flowchart in FIG. 11, Primary User un-focuses User 2. The volumes and tile sizes of User 2 and all other users decrease from the perspective of Primary User, since Primary User is no longer focused on them as they were in the first column of the flowchart when Primary User was only focused on User 1.

In the fourth column of the flowchart in FIG. 11, Primary User un-focuses all users, including User 1. The volume of User 1 from the perspective of Primary User is set to Master Volume, which now increases since Primary User is not focused on any users. Hence, the volumes of all users in the session will be equal from the perspective of Primary User. User 1's tile decreases in size to be the same size as the tiles of User 2 and all other users from the perspective of Primary User. Primary User will now hear all other users' volumes at 100%.

FIG. 12 is a flowchart that illustrates the views a user sees in certain embodiments of the invention when joining a session. When the user first joins the session, their screen is in Tile View, which shows all users' tiles, also referred to as video feeds, as the same size. This view is scrollable, meaning a user can scroll and view the tiles of other users that were not visible before because the size of the screen on the user's device was limiting the amount of tiles visible at one time. When that user focuses on another user, the view that the focusing user sees is changed to Focused View. In this view, the focusing user sees the focused user's tile as bigger than the unfocused users' tiles. The unfocused users' tiles appear in a scrollable strip on the side of the focusing user's screen. The focusing user's own tile also appears smaller than the tiles of their focused users.

If the focusing user only focuses on one user creating one focused user for the focusing user, then that focused user's tile will cover the entirety of the focusing user's session window, creating a Full View, or Full Screen View, of the focused user. Full View/Full Screen View are a subset of Focused View. The terms Full Screen View and Full View may be used interchangeably. In Full Screen View, the focusing user will still see their own tile as well as the scrollable strip of unfocused users' tiles in the foreground of the focused user's tile. The focusing user can switch to Tile View, which shows all users' tiles as the same size on the focusing user's session window. The volume of unfocused users will still remain lower than that of the focused users in Tile View.

If the focusing user focuses on multiple users, Focused View will show all that user's focused users' tiles as the same size. These tiles may not be in Full Screen View but will still be larger than the tiles of unfocused users and the focusing user.

Figure 13:
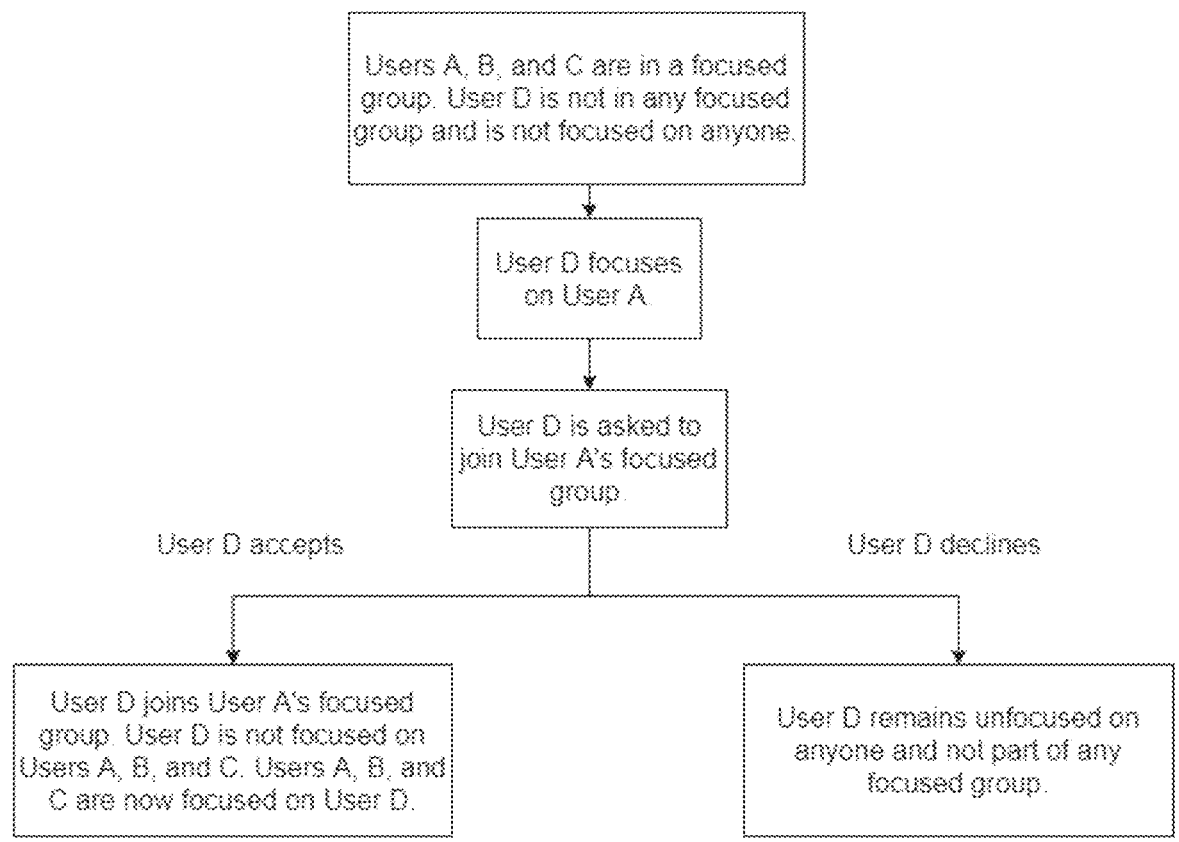
FIG. 13 is a flowchart that illustrates how focused groups function in some embodiments of the invention.

FIG. 13 is a flowchart that illustrates how focused groups function in some embodiments of the invention. In the embodiments of the invention illustrated in FIG. 13, one or more users can focus on one another forming a focused group as in other embodiments of the invention. However, in the embodiments of the invention illustrated in FIG. 13, other users that are not a part of said focused groups must either remain unfocused on each member of said focused groups, or focus on all users that are participating in one of said focused groups. This differs from the embodiments illustrated in FIG. 8A, FIG. 8B, FIG. 8C, FIG. 8D, FIG. 9 and FIG. 11 in that in the embodiments illustrated in FIG. 13, users cannot focus on one user of a focused group and not other users of said focused group.

For example, FIG. 13 illustrates a focused group with Users A, B, and C. User D is not a part of any focused group and is not focused on anyone. If User D chooses to focus on User A, User D is then asked to join the entire focused group, since User A is in said focused group. If User D accepts and joins the focused group, Users A, B, and C will all be focused on User D and user D will be focused on Users A, B, and C. If User D declines and does not join the focused group, User D will remain unfocused on anyone and not a part of any focused group.

In some of the embodiments of the invention illustrated in FIG. 13, the session window of each user displays a conversation curtain, which may be a list of all of the focused groups occurring in a session at any given point in time. A user may select any of said focused groups from the conversation curtain to focus on all users that are participating in that focused group, and thus join that focused group themselves.

In the embodiments of the invention illustrated in FIG. 13, users may still focus on only one user and not other users if that one user is not part of a focused group.

In some of the embodiments of the invention, users that are not focused on other users and are not focused on by other users are part of the unfocused group. Users in the unfocused group see each other's audio and hear each other's video at a greater prominence than the audio and video of users within focused groups. In this manner, the unfocused group comprised of unfocused users becomes a sort of focused group on its own. In these embodiments, the unfocused group may act as a lobby of the session that users enter when they first join the session. Said users may then enter into focused groups from the unfocused group, and vice-versa.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries.

To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A video communication system comprising:
   a receiver configured to receive an audio input and a video input from a plurality of user devices accessing a session; and
   a processor configured to:
      enable each user device to unilaterally define a focus relationship vis-a-vis another user device; and
      output, at each user device, each audio input and each video input based on the focus relationship,
   wherein the focus relationship comprises at least one focused user, a focusing user, and at least one unfocused user,
   wherein the at least one focused user, the focusing user, and the at least one unfocused user each use a user device to access the session,
   wherein the processor is configured to provide a session window on each user device accessing the session, wherein each session window comprises tiles that display each video input,
   wherein the session window displays each tile in a Focused view when a focused relationship is defined,
      whereby the tile of each associated focused user appears larger on the session window than the tile of each associated unfocused user,
      and whereby the tile of each associated focused user appears the same size on the session window as the tile of all other associated focused users,
      and whereby the tile of each associated unfocused user appears in a scrollable strip on the session window,
      and whereby the tile of the focusing user appears in the scrollable strip,
   wherein the session window displays each tile in a Tile View when no focus relationship is defined,
      whereby the tiles of all users appear the same size on the session window,
   wherein no request nor permission is required between user devices to define the focus relationship.

2. The video communication system of claim 1, wherein all audio input and all video input is audible and visible, respectively, to the plurality of user devices accessing the session.

3. The video communication system of claim 2, wherein each focusing user has at least one associated focused user, wherein the output of the audio input of each associated focused user is more prominent than the output of the audio input of each unfocused user.

4. The video communication system of claim 3, wherein the output of each audio input is independently adjustable, at each user device, by volume.

5. The video communication system of claim 4, wherein each user device unilaterally joins the one or more focused user so unilaterally defined.

6. The video communication system of claim 5, wherein the output of the audio input of each associated focused user is more prominent than the output of the audio input of each unfocused user.

7. A method for dynamically associating a plurality of user devices using the video communication system of claim 1, the method comprising:
   receiving, at each user device, a plurality of media streams, each of the plurality of media streams corresponding to a respective one of the plurality of user devices; and
   each user device configured to access each media stream via a tile represented on a graphical user interface to the user device, wherein a prominence of each tile is based on the focus relationship between said user device and said media stream, and wherein each tile provides focus functionality to unilaterally define said focus relationship,
   whereby each of the plurality of media streams comprises the audio input and the video input from its respective user device.

8. The method of claim 7, whereby no request nor permission is required between user devices to define the focus relationship.

9. The method of claim 8, wherein an output of the media stream is a function of the prominence.

10. The method of claim 9, further comprising associating, at each user device, the plurality of users into a plurality of groups based the respective focus relationship.

11. The method of claim 10, wherein the plurality of groups comprises one or more focused groups and one unfocused group.

12. The method of claim 11, wherein the prominence associated with the unfocused group comprises a non-zero unfocused volume of the respective audio streams and a less prominent unfocused view of the respective video streams, said video streams being in the form of tiles.

13. The method of claim 12, wherein the prominence associated with the focused group comprises a focused volume of the respective audio streams and a focus view of the respective video streams, wherein the focused volume is more prominent than the non-zero unfocused volume, and wherein the focus view is more prominent than the unfocused view.

14. The method of claim 13, wherein the focus view of a two-user focus group is a full screen view.

15. The method of claim 7, wherein said focus relationship is defined by way of a command to at least one of the plurality of user devices.

* * * * *